(12) United States Patent
Oba

(10) Patent No.: US 6,590,720 B2
(45) Date of Patent: Jul. 8, 2003

(54) OPTICAL LENS UNIT HAVING A MECHANISM FOR ADJUSTING THE FOCAL POINT OF THE OPTICAL LENS

(75) Inventor: Eiji Oba, Kawasaki (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/905,862

(22) Filed: Jul. 17, 2001

(65) Prior Publication Data

US 2002/0005997 A1 Jan. 17, 2002

(30) Foreign Application Priority Data

Jul. 17, 2000 (JP) .................................. 2000-216406
Jul. 11, 2001 (JP) .................................. 2001-210984

(51) Int. Cl.[7] .................................................. G02B 7/02
(52) U.S. Cl. ........................ 359/819; 359/820; 359/822
(58) Field of Search ................................ 359/819, 820, 359/822, 823

(56) References Cited

U.S. PATENT DOCUMENTS

| | | | |
|---|---|---|---|
| 3,696,725 A | 10/1972 | Lange | 359/823 |
| 3,970,370 A | 7/1976 | Kawai | 359/826 |
| 4,072,396 A | 2/1978 | Ross | 359/425 |
| 4,194,811 A | 3/1980 | Barry | 359/739 |
| 4,431,267 A | 2/1984 | Finck et al. | 362/191 |
| 4,457,619 A | 7/1984 | Takahashi et al. | 355/60 |
| 4,496,217 A | 1/1985 | Aoyagi | 359/823 |
| 4,679,905 A | 7/1987 | Westover | 359/826 |
| 4,720,167 A | 1/1988 | Okura | 359/503 |
| 5,052,782 A | * 10/1991 | Myer | 359/827 |
| 5,177,641 A | 1/1993 | Kobayashi et al. | 359/820 |
| 5,262,900 A | 11/1993 | Gerber | 359/811 |
| 5,548,450 A | 8/1996 | Kang | 359/822 |
| 5,557,474 A | * 9/1996 | McCrary | 359/820 |
| 6,144,505 A | * 11/2000 | Nakanishi et al. | 359/811 |

FOREIGN PATENT DOCUMENTS

EP    0 366 984    5/1990

OTHER PUBLICATIONS

Paatent Abstracts of Japan, JP 59 040608, Mar. 6, 1984.

* cited by examiner

Primary Examiner—Georgia Epps
Assistant Examiner—Timothy J Thompson
(74) Attorney, Agent, or Firm—Oblon, Spivak, McClelland, Maier & Neustadt, P.C.

(57) ABSTRACT

An optical lens unit comprises an optical lens for focusing a light beam, a hollow cylindrical lens holder having, on an inner circumferential surface, a support section contacting one surface of the optical lens and supporting a circumferential part thereof, an elastic member interposed between the support section and the optical lens, and a lens fastener movable along an optical axis of the optical lens, clamping the optical lens jointly with the lens holder, and contacting, at one end, the other surface of the optical lens. The lens fastener pushes the circumferential part of the optical lens, thereby to deform the elastic member to adjust the position of a focal point of the optical lens.

18 Claims, 21 Drawing Sheets

OPTICAL LENS UNIT HAVING A MECHANISM FOR ADJUSTING THE FOCAL POINT OF THE OPTICAL LENS

CROSS-REFERENCE TO RELATED APPLICATIONS

This application is based upon and claims the benefit of priority from the prior Japanese Patent Applications No. 2000-216406, filed Jul. 17, 2000; and No. 2001-210984, filed Jul. 11, 2001, the entire contents of both of which are incorporated herein by reference.

BACKGROUND OF THE INVENTION

The present invention relates to an optical lens unit, more particularly to a mechanism for adjusting the focal point of the optical lens incorporated in an optical lens unit.

Recent years have seen a remarkable advance in portable photographing devices and portable communication devices. The amount of data that a portable communication device can transmit is ever increasing. Along with this increase in transmittable data amount, there undergoes development of portable communication device, such as mobile telephones, each equipped with an image sensor. A mobile telephone with an image sensor functions not only as an audio communication device, but also as an image communication device. One of the components indispensable to photographing devices is an optical lens unit, which is assembled directly to the image sensor. In a camera system in which an image is focused through a lens, it is essential that lens position is adjusted such that lens focus point comes to the focal plane of the image sensor.

A conventional optical lens unit will be described with reference to FIG. 1, which is a sectional view of the optical lens unit.

As FIG. 1 shows, the optical lens unit 10 comprises a lens holder 11, an optical lens 12, a lens barrel 13, and a fastening ring 14. The small range focal point adjusting mechanism can be applied to adjust the small variation of focal distance in an optical lens or to adjust the flange back variation in the manufacturing process of a lens unit to the image sensor.

The lens holder 11 is a hollow cylinder. The lens holder 11 has a female screw 15 in the inner circumferential surface.

The lens barrel 13 is a hollow cylindrical component. The lens barrel 13 has a male screw 16 on the outer circumferential surface. The lens barrel 13 is held in part in the lens holder 11, with the male screw 16 in mesh with the female screw 15 of the lens holder 11. When rotated, the lens barrel 13 moves along the optical axis 1 of the optical lens unit 10.

The optical lens 12 has a collar. The collar 12 is clamped between the lens barrel 13 and the fastening ring 14. The optical lens 12 is thereby held by and secured to the lens holder 11.

A light source 2 applies a light beam to the optical lens 12. The optical lens 12 focuses the light beam, forming an image in an image-forming plane. The lens barrel 13 may be rotated, thereby moving the optical lens 12 in the lens holder 11, along the optical axis of the optical lens unit 10. As the lens 12 is so moved, its focal point is moved or adjusted.

In the optical lens unit 10 of FIG. 1, the female screw 16 of the lens holder 13 and the female screw 16 of the lens barrel 13 constitute a mechanism for adjusting the focal point of the optical lens 12. The focal point adjusting mechanism enables each optical lens units to be adjusted after assembly. This is indispensable to achieve high precision focusing, using low cost production process of a camera module incorporating a lens unit. This eliminates the need to make accurate lens assembly. Also, optical lens may have a variation on the focal distance that differs from the design value, for the following reason.

Generally, low cost plastic optical lenses are massproduced by means of molding. In the molding, molten resin is poured into molds and cooled therein, forming lenses, and the lenses thus formed are removed from the molds. The resin is gradually cooled down in the molds, thereby improving the characteristics of the resultant lenses. There is the trend that the resin cool down process is done in a short time in order to enhance the productivity of optical lenses. Consequently, the lenses have characteristics, including the focal distance, which may vary from the design values. To adjust the focal distance of each individual lens to a desired value, it is necessary to use the focal point adjusting mechanism described above. There are also variations of dimension in the lens collar 12, the lens holder 13, not to mention assembly positioning variation of image sensor and base substrate as well.

As described above, the female screw 15 of the lens holder 13 and the female screw 16 of the lens barrel 13 constitute the focal point adjusting mechanism in the optical lens unit 10. When the barrel 13 is rotated, the lens 12, barrel 13 and ring 14 move together. Both the holder 11 and the barrel 13 have a relatively large diameter. It is inevitably difficult to render the optical lens unit 10 smaller. Further, it is difficult to assemble the lens unit 10 to the image sensor with high precision, which constitutes the focal point adjusting mechanism. Additionally, dust may be generated as the screws 15 and 16 slide one upon the other in frictional contact. Dust, if generated, floats in the lens holder 11 through which the light beam travels from the lens 12 toward the focal point. The dust may therefore adversely influences the image formed in the image-forming plane.

BRIEF SUMMARY OF THE INVENTION

An optical lens unit according to an aspect of the present invention comprises: an optical lens for focusing a light beam; a hollow cylindrical lens holder having, on an inner circumferential surface, a support section located on one side of the optical lens and supporting a circumferential part thereof; an elastic member interposed between the support section and the optical lens; and a lens fastener movable along an optical axis of the optical lens, clamping the optical lens jointly with the lens holder, contacting, at one end, the other side of the optical lens, and pushing the circumferential part thereof, thereby to deform the elastic member to adjust the position of a focal point of the optical lens.

DETAILED DESCRIPTION OF THE INVENTION

Figure 1:
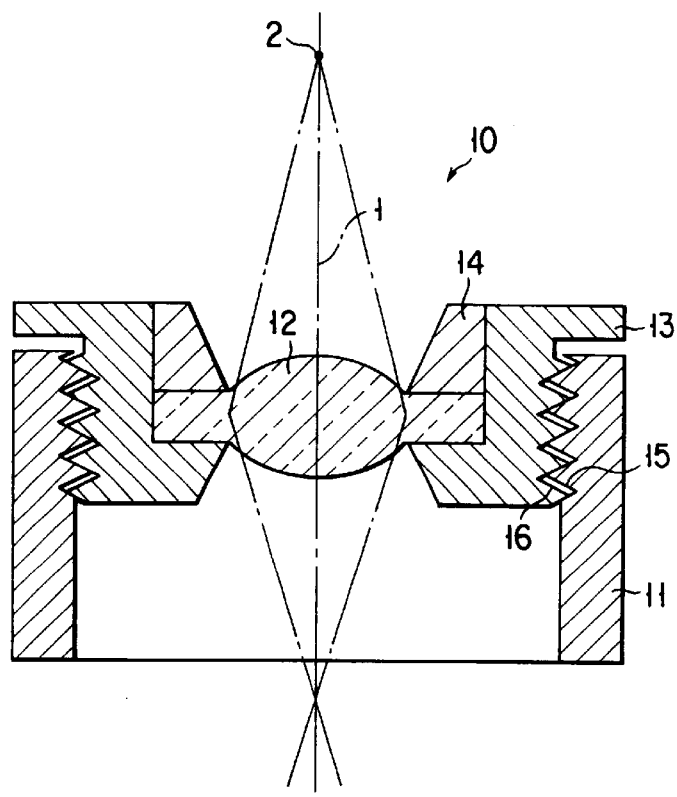
FIG. 1 is a sectional view of a conventional optical lens unit.
Figure 2A:
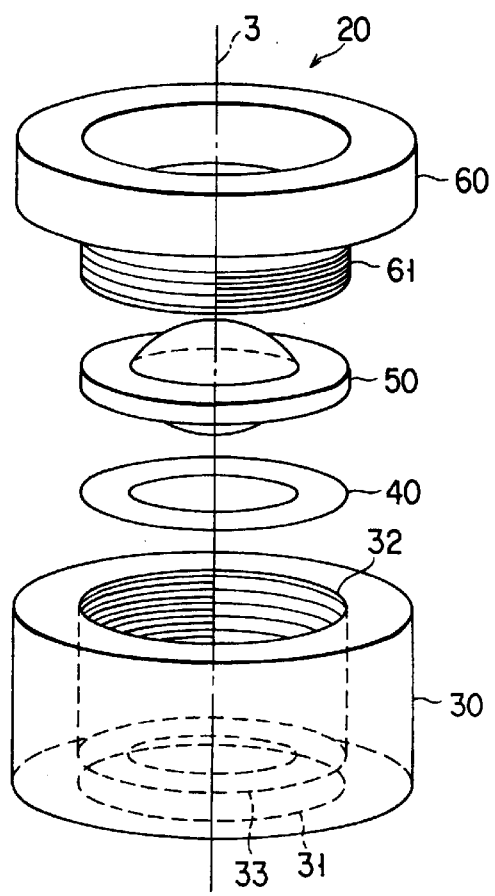
FIG. 2A is an exploded view of an optical lens unit according to a first embodiment of the invention, showing the components thereof.
Figure 2B:
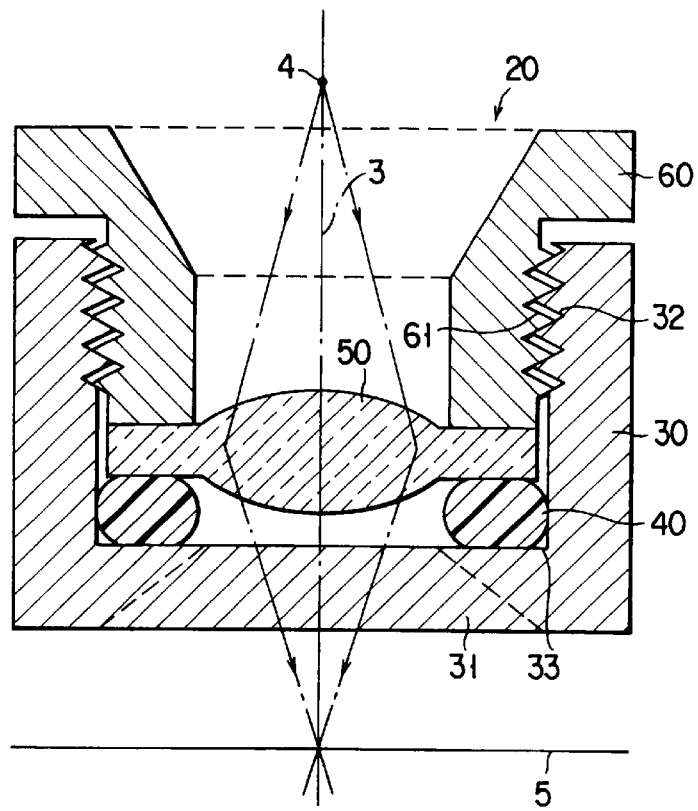
FIGS. 2B and 2C are sectional views, respectively explaining how the unit of FIG. 2A is operated to set the focal point at a long distance and a short distance.
Figure 2C:
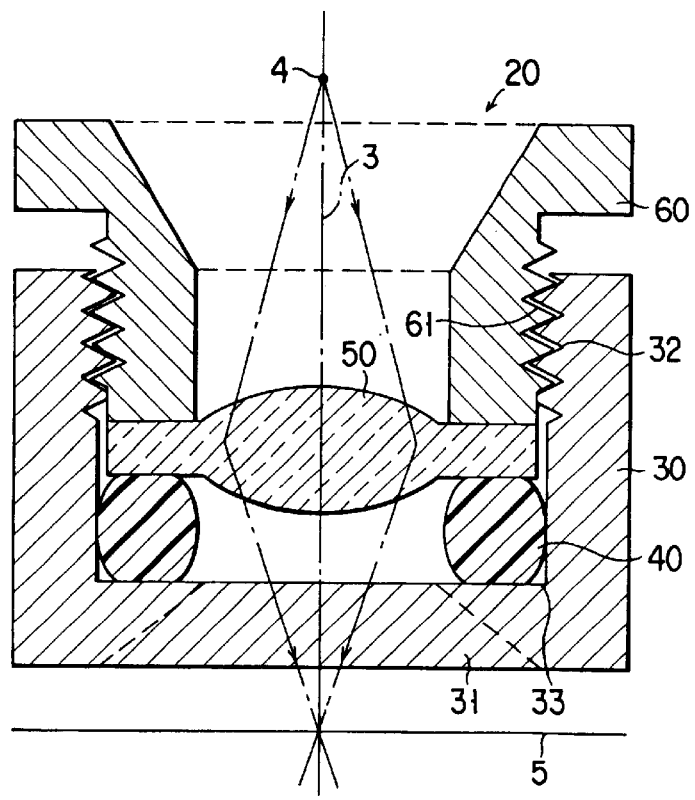

FIG. 2A is an exploded view of an optical lens unit 20, which is the first embodiment of the present invention. FIGS. 2B and 2C are sectional views of the optical lens unit 20. The optical lens unit has a focal-point-adjusting mechanism.

As shown in FIGS. 2A to 2C, the optical lens unit 20 comprises a lens holder 30, a cushion 40, an optical lens 50, and a lens fastener 60.

The lens holder 30 is a hollow cylinder. It has an opening 31 in the bottom and a female screw 32 in the inner circumferential surface.

The cushion 40 has a refractive index similar to that of the optical lens 50. It is a black light-absorbing body that is elastic. The cushion 40 is shaped like a ring and functions as a seal. It is mounted on the bottom (or flange 33) of the lens holder 30. Functioning as a seal, the cushion 40 remains in close contact with the flange 33 of the lens holder 30.

The optical lens 50 has a collar. The lens 50 is provided on the flange 33 of the lens holder 30, with its collar set in contact with the cushion 40. The optical lens 50 is arranged with its optical axis 3 aligned with the center of the opening 31 of the lens holder 30. Note that the cushion 40 contacts the collar of the optical lens 50.

The lens fastener 60 is shaped like a hollow cylinder, opening at both the top and the bottom. It consists of a large-diameter section and a small-diameter section. The small-diameter section, or lower section, has an outer diameter that is equal to the inner diameter of the lens holder 30. The small-diameter section has a male screw 61 on its outer circumferential surface. The male screw 61 meshes with the female screw 32 of the lens holder 30. The optical lens 50 has its collar held between the cushion 40 and the small-diameter section of the lens fastener 60. Thus, the optical lens 50 is held in the lens holder 30.

Figure 3A:
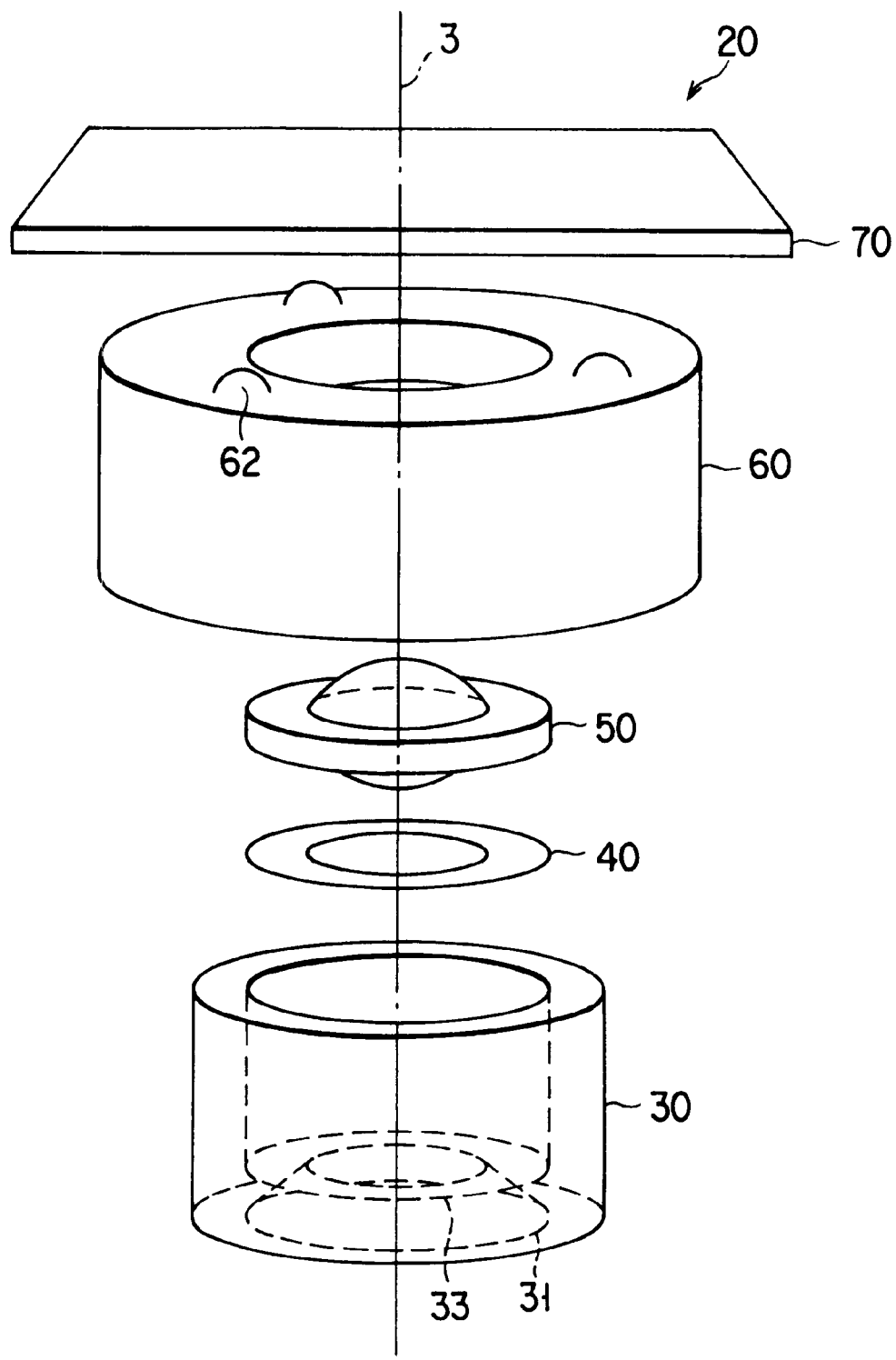
FIG. 3A is an exploded view of an optical lens unit according to a second embodiment of the invention, illustrating the components thereof.
Figure 3B:
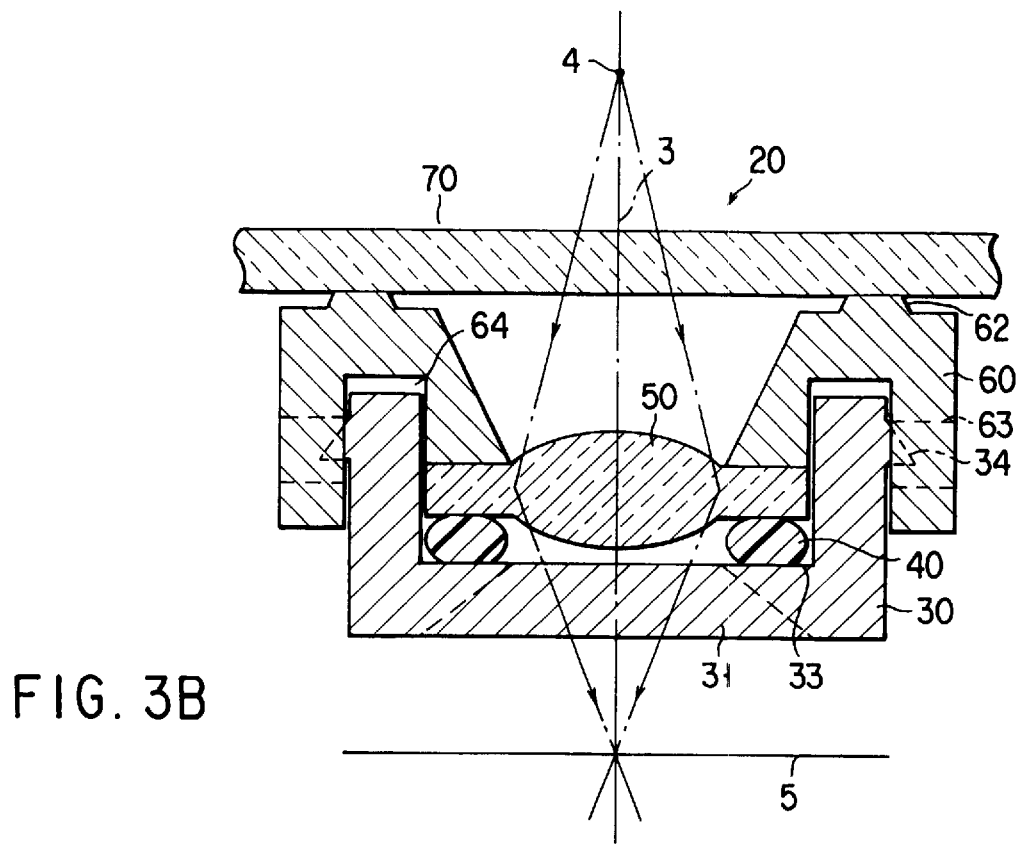
FIGS. 3B and 3C are sectional views, respectively explaining how the unit of FIG. 3A is operated to set the focal point at a long distance and a short distance.

As shown in FIGS. 3B and 2C, a light source 4 emits a light beam incident to the optical lens 50. The lens 50 focuses the light beam, which passes through the opening 31 of the lens holder 30. The light beam forms an image in an image-forming plane 5. In the image-forming plane 5 there is provided a photosensor (not shown).

The method of adjusting the focal point of the optical lens 50 will be described, with reference to FIGS. 2B and 2C. FIG. 2B is a sectional view, explaining how the optical lens unit 20 is operated to set the focal point at a long distance. FIG. 2C is a sectional view, too, explaining how the unit 20 is operated to set the focal point at a short distance.

To adjust the focal point in position, the lens fastener 60 is rotated. The lens fastener 60 is thereby moved up or down along the optical axis 3 of the lens 50, by virtue of the focal point adjusting mechanism constituted by the female screw 32 and the male screw 61. When the lens fastener 60 is moved down as shown in FIG. 2B, it pushes optical lens 50 downwards, compressing the cushion 40. Therefore, the optical lens 50 moves toward the flange 33 of the lens holder 30. Conversely, when the lens fastener 60 is moved up as shown in FIG. 2C, it pushes optical lens 50 upwards, expanding the cushion 40. In this case, the optical lens 50 moves away from the flange 33 of the lens holder 30. Thus, the focal point of the lens 50 can be adjusted in position.

The lens fastener 60 needs only to be designed to push the optical lens 50. The optical lens 50 can be moved up and down to adjust the focal point, thanks to the elastic deformation of the cushion 40. The focal point adjusting mechanism is simple in structure, comprising only a few components. Comprising a few components, the mechanism helps to reduce the size of the optical lens unit 20 and decrease the number of manufacturing steps thereof.

As described above, the cushion 40 is provided between the optical lens 50 and the flange 33 of the lens holder 30. Hence, dust, if any generated due to the friction between the male screw 32 and the female screw 61, would not enter the space between the optical lens 50 and the image-forming plane 5. In addition, the stray light enters to the collar of the lens 50 propagates into the cushion 40, hardly reflected at the interface between the cushion 40 and the lens 50. This is because the cushion 40 and the lens 50 are made of materials that have similar refractive indices. Further, the cushion 40, which is a black light-absorbing body, absorbs the stray light coming to it. Thus, stray light is prevented from reaching the image-forming plane 5. Moreover, the cushion 40 attenuates pseudo signals such as flare, enhancing the image contrast in the image-forming plane 5.

Figure 3C:
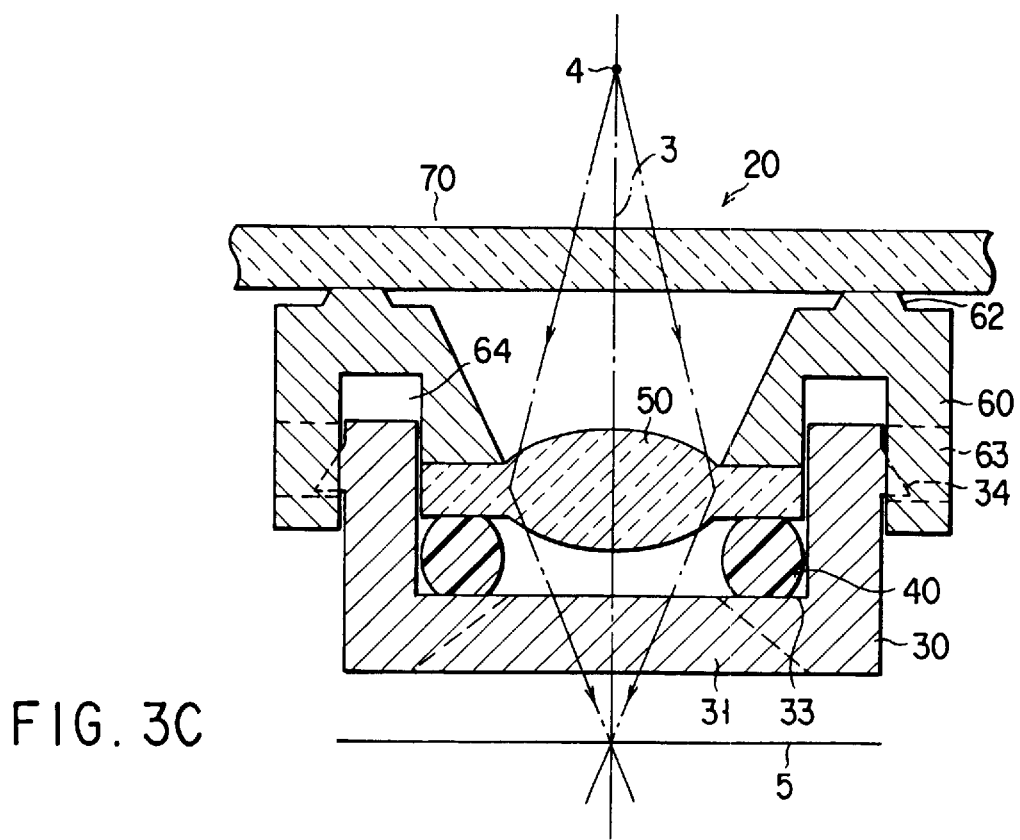

An optical lens unit 20 according to the second embodiment of the present invention will be described, with reference to FIGS. 3A to 3C. FIG. 3A is an exploded view of this optical lens unit 20. FIGS. 3B and 3C are sectional views of the optical lens unit 20.

As shown in FIG. 3A, the second embodiment comprises a lens holder 30, a cushion 40, an optical lens 50, a lens fastener 60, and a lens cover 70.

The lens holder 30 is a hollow cylinder. It has an opening 31 in the bottom and a projection 34 on the outer circumferential surface.

The cushion 40 has a refractive index similar to that of the optical lens 50. It is a black light-absorbing body that is elastic. The cushion 40 is shaped like a ring and functions as a seal. It is mounted on the bottom (or flange 33) of the lens holder 30. Functioning as a seal, the cushion 40 remains in close contacts with the flange 33 of the lens holder 30.

The optical lens 50 has a collar. The lens 50 is provided on the flange 33 of the lens holder 30, with its collar held in contact with the cushion 40. The optical lens 50 is arranged with its optical axis 3 aligned with the center of the opening 31 of the lens holder 30. It should be noted that the cushion 40 is set in contact with the collar of the optical lens 50.

The lens fastener 60 is a hollow cylinder. The fastener 60 has an annular groove 64 made in the bottom. In the annular groove 64, the upper part of the lens holder 30 is inserted. In the outer inner surface of the annular groove 64, a groove 63 is cut. This groove 63 has a cross section similar to that of the projection 34 of the lens holder 30. The lens fastener 60 further has at least three projections 62 on the top. The projections 62 support the lens cover 70, determining the horizontal position the lens cover 70 takes with respect to the lens fastener 60.

The lens cover 70 is a transparent one, protecting the optical lens 50. The cover 70 has depressions in its lower surface. In the depressions the projections 62 of the lens fastener 60 are fitted, preventing the lens cover 70 from moving in the horizontal direction with respect to the lens fastener 60.

In the second embodiment, i.e., the optical lens unit 20 of FIGS. 3A to 3C, lens fastener 60 is not fixed to the lens holder 30. That is, the fastener 60 can move up and down along the optical axis 3 of the lens 50. This is because the upper part of the lens holder 30 is loosely inserted in the annular groove 64 of the lens fastener 60, constituting a so-called "floating structure." The longest distance the lens fastener 60 can move along the optical axis 3 is the difference between the length of the groove 63 of the fastener 60 and the length of the projection 34 of the lens holder 30.

As shown in FIGS. 3B and 3C, a light source 4 emits a light beam, incident to the optical lens 50 through the lens cover 70. The lens 50 focuses the light beam, which passes through the opening 31 of the lens holder 30. The light beam forms an image in an image-forming plane 5.

The method of adjusting the focal point of the optical lens 50 will be described, with reference to FIGS. 3B and 3C. FIG. 3B is a sectional view, explaining how the optical lens unit 20 is operated to set the focal point at a long distance. FIG. 3C is a sectional view, too, explaining how the unit 20 is operated to set the-focal point at a short distance.

In order to adjust the focal point in position, the lens cover 70 is moved along the optical axis 3 (or in the vertical direction in FIGS. 3B and 3C). When the cover 70 is pushed toward the optical lens 50, the lens fastener 60 pushes the optical lens 50 onto the flange 33 of the lens holder 30. The cushion 40 held between the bottom of the holder 30 and the collar of the lens 50 is thereby compressed. As a result, the optical lens 50 moves toward the flange 33. Conversely, when the cover 70 is pulled away from the optical lens 50, the cushion 40 expands by virtue of its elasticity. Hence, the optical lens 50 moves away from the flange 33 toward the lens cover 70. Thus, the focal point of the lens 50 can be adjusted in position.

In the second embodiment of the invention, it suffices to push the lens cover 70 to adjust the position the lens fastener 60 takes on the optical axis 3, with respect to the lens holder 30. The cover 70 may be pushed, compressing the cushion 40, and may be pulled, expanding the cushion 40, thereby to adjust the focal point of the optical lens 50. No screw needs to be cut in the lens holder 30. Nor is it necessary to cut a screw in the lens fastener 60. Hence, the lens holder 30 and the lens fastener 60 can be simplified in structure. This helps to reduce the size of the optical lens unit 20. Having simple structures, the lens holder 30 and the lens fastener 60 can be manufactured at low cost. Therefore, the manufacturing cost of the second embodiment greatly decreases. Moreover, the lens holder 30, cushion 40, lens 50, lens fastener 60 and lens cover 70 can be easily assembled since neither the holder 30 nor the fastener 60 has a screw, thus enhancing the assembling precision. Since the holder 30 and the fastener 60 have no screws at all, no dust is generated at the contact between the holder 30 and the fastener 60. Further, a force is applied to only the projections 62 of the fastener 60 as the lens cover 70 is pushed down, which decreases the force that may move the lens cover 70 in the horizontal direction with respect to the lens fastener 60.

Hence, the second embodiment, i.e., the optical lens unit 20 of FIGS. 3A to 3C can be advantageous not only in productivity but also in the reliability of forming an image in the image-forming plane 5.

Figure 4A:
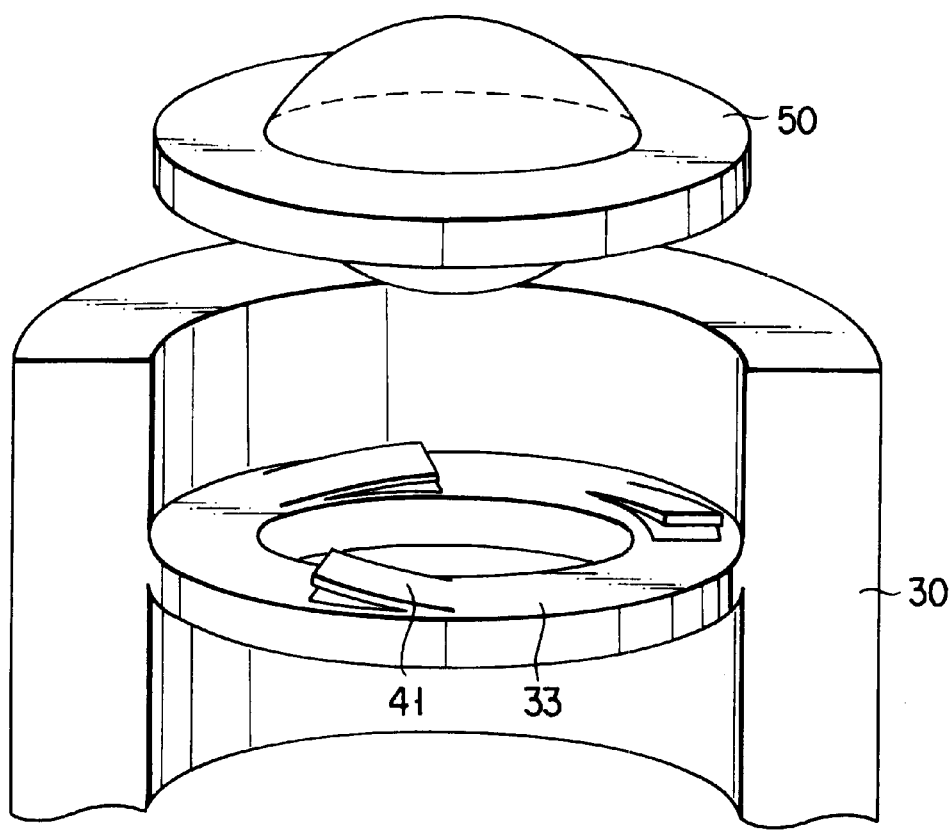
FIG. 4A is an exploded view of a section of an optical lens unit according to a third embodiment of the invention.
Figure 4B:
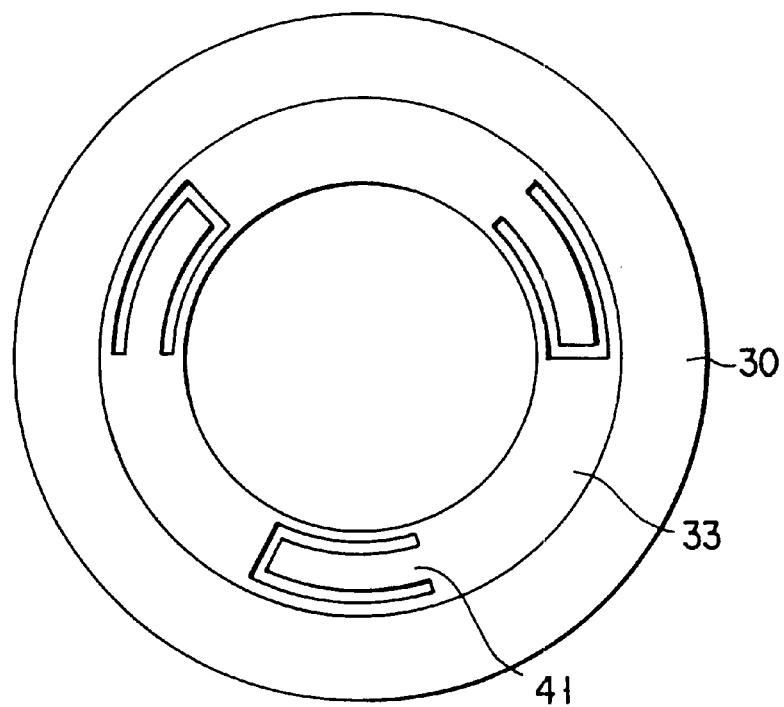
FIG. 4B is a top view of the lens holder incorporated in the optical lens unit shown in FIG. 4A.
Figure 4C:
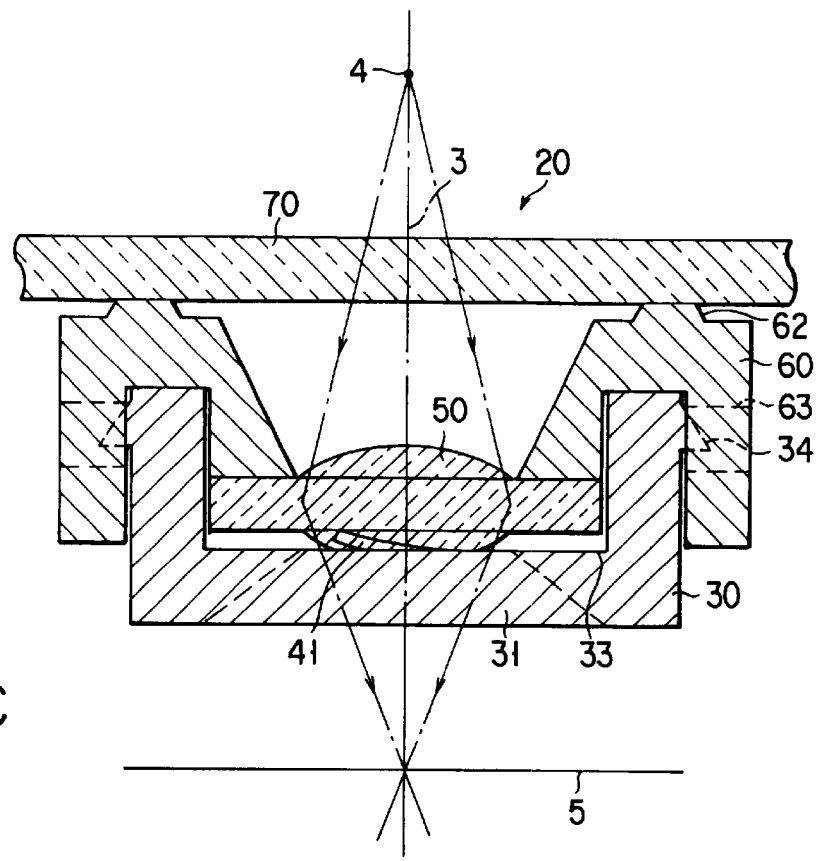
FIGS. 4C and 4D are sectional views, respectively explaining how the unit of FIG. 4A is operated to set the focal point at a long distance and a short distance.
Figure 4D:
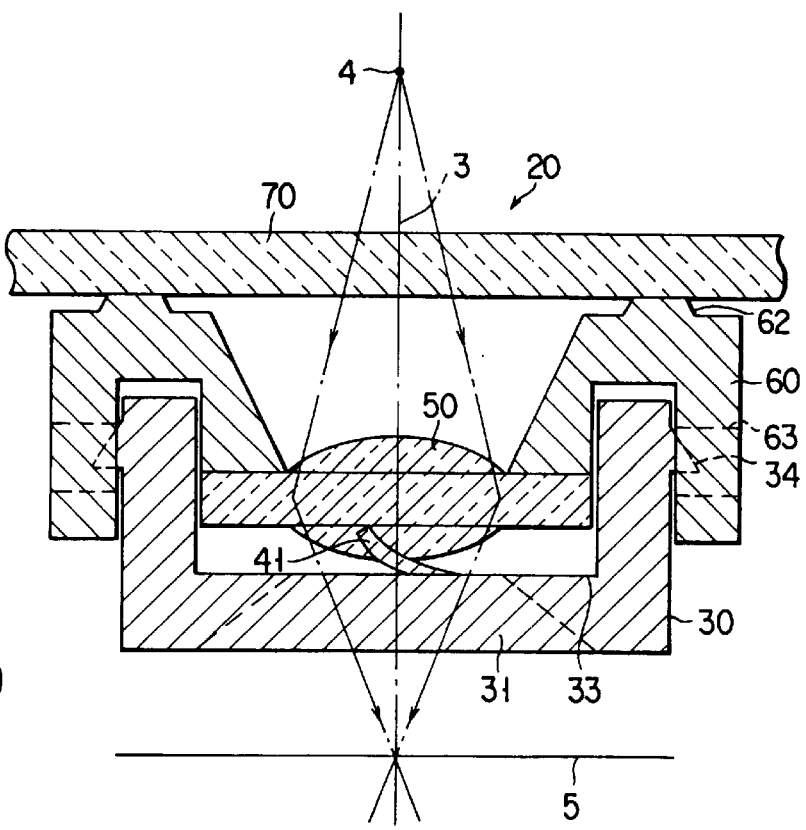

An optical lens unit 20 according to the third embodiment of the present invention will be described, with reference to FIGS. 4A to 4D. The third embodiment is identical to the second embodiment, except that springs are used in place of the cushion 40. FIG. 4A is an exploded view of a section of the third embodiment. FIG. 4B is a top view of the lens holder incorporated in the optical lens unit shown in FIG. 4A. FIGS. 4C and 4D are sectional views of the third embodiment.

As can be seen from FIG. 4A, the springs 41 are used in place of the cushion 40, in the third embodiment. The springs 41 are formed integral with the flange 33 of the lens holder 30. They are shaped like a flap. Each spring 41 contacts, at its upper end, the collar of the optical lens 50. The springs 41 are bent downwards when the lens fastener 60 is pushed down. Hence, as the force applied to the fastener 60 is controlled, the optical lens 50 is moved along the optical axis 3 (FIGS. 4C and 4D), adjusting the focal point in position.

Since the springs 41 are formed integral with the lens holder 30, the third embodiment comprises fewer components than otherwise. It follows that the third embodiment is easy to assemble and can, therefore, be manufactured at low cost.

The third embodiment may be redesigned to be identical to the first embodiment, except that the springs 41 are used in place of the cushion 40. In this case, however, dust may be generated due to the friction between the male screw 32 of the lens holder 30 and the female screw 61 of the lens fastener 60. In consideration of this, it is desirable to apply the third embodiment to the second embodiment that has no screws at all.

Figure 5A:
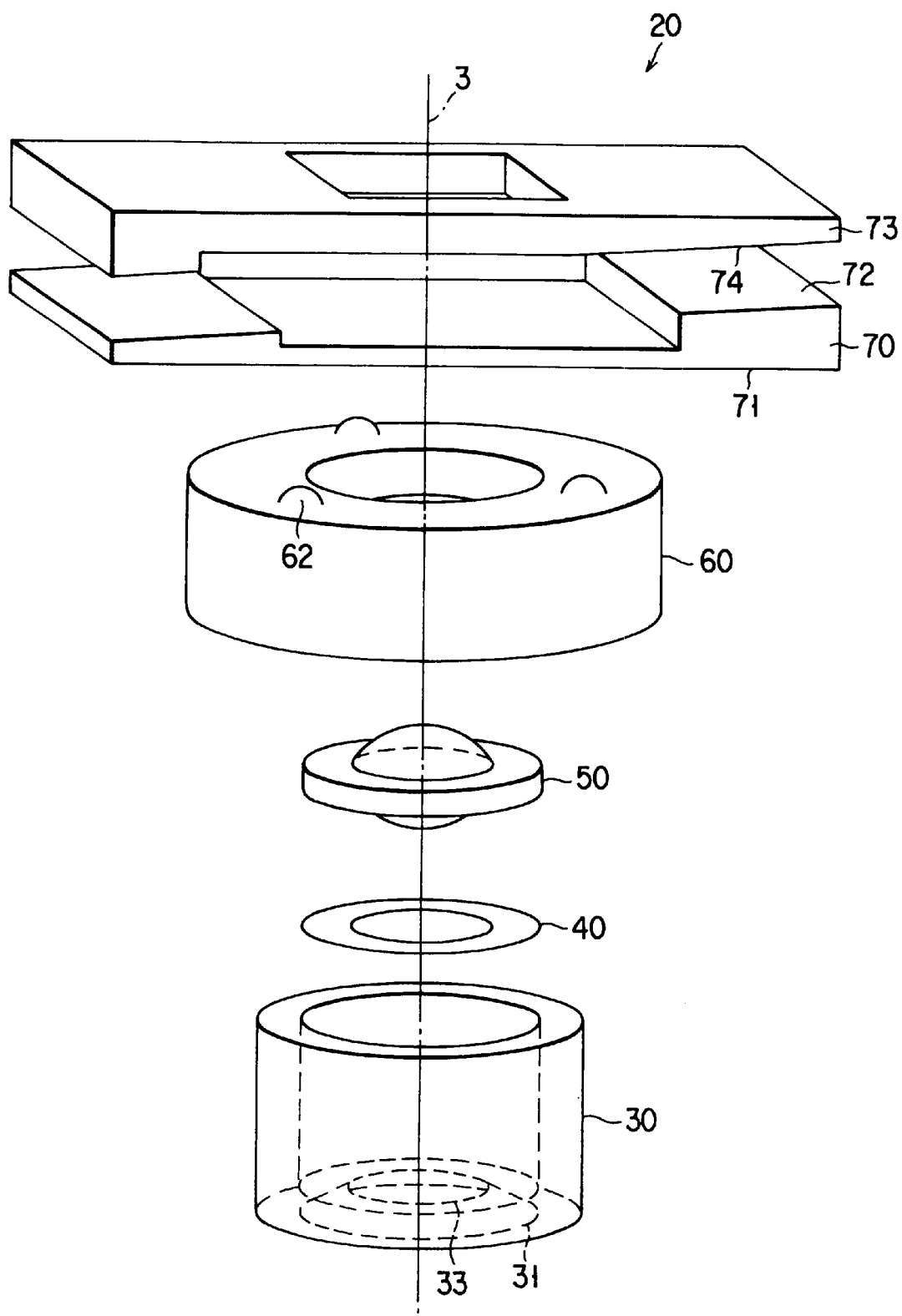
FIG. 5A is an exploded view of a section of an optical lens unit according to a fourth embodiment of the invention.
Figure 5B:
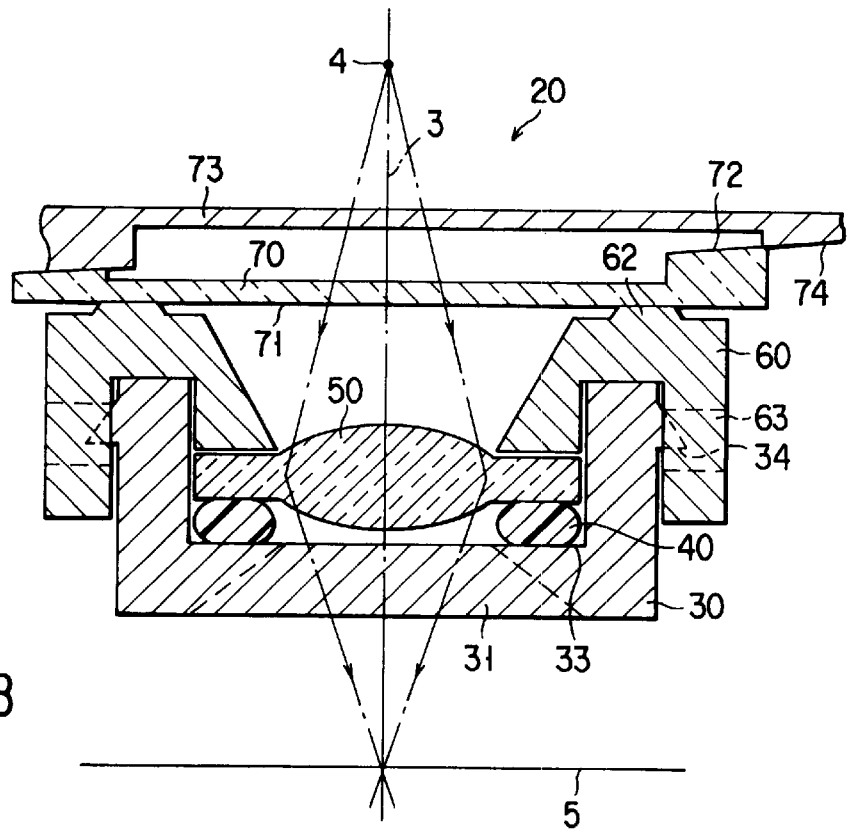
FIGS. 5B and 5C are sectional views, respectively explaining how the unit of FIG. 5A is operated to set the focal point at a long distance and a short distance.
Figure 5C:
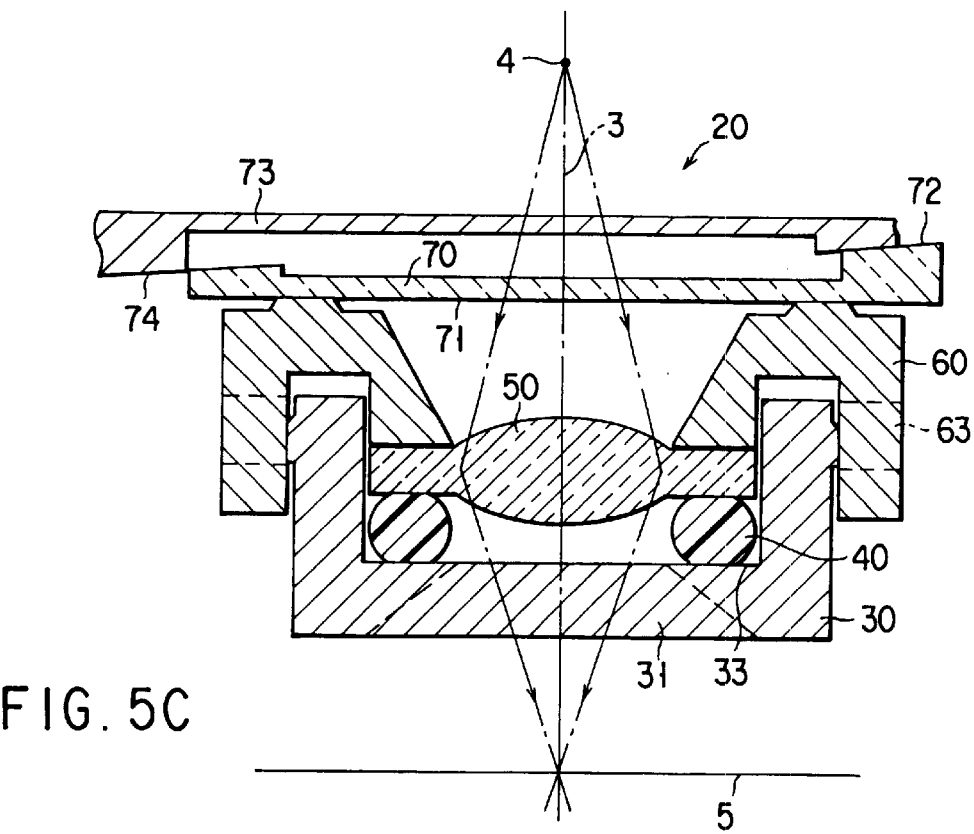

An optical lens unit 20 according to the fourth embodiment of the invention will be described, with reference to FIGS. 5A to 5C. The fourth embodiment is identical to the second embodiment, except that it comprises an additional component, i.e., a focal point adjusting slide plate. FIG. 5A is an exploded view of a section of the fourth embodiment. FIGS. 5B and 5C are sectional views of the optical lens unit 20.

The focal point adjusting slide plate cooperates with the lens cover to adjust the focal point of the optical lens, as will be described later in detail.

As FIG. 5A shows, the cushion 40 is mounted on the flange 33 of the lens holder 30, and the optical lens 50 is arranged, with its collar set in contact with the cushion 40. The cushion 40 is therefore interposed between the flange 33 and the collar of the lens 50. The upper part of the lens holder 30 is loosely inserted in the annular groove of the lens fastener 60. The optical lens 50 is thereby held in the lens holder 30, with its collar clamped between the cushion 40 and the lens fastener 60. The projections 62 of the lens fastener 60 support the lens cover 70, while fitted in the depressions made in the lower surface 71 of the lens cover 70.

The lens cover 70 is positioned, with the lower surface 71 extending at right angles to the optical axis 3 of the optical lens 3. The upper surface 72 of the lens cover 70 inclines at a predetermined angle to the optical axis 3.

The focal point adjusting slide plate 73 is placed on the upper surface 72 of the lens cover 70. The lower surface 74 of the plate 73, which contacts the upper surface 72 of the cover 70, is inclined to the optical axis 3 at an angle similar to the inclination angle of the upper surface 72.

As shown in FIGS. 5B and 5C, a light source 4 emits a light beam, incident to the optical lens 50, first through the focal point adjusting slide plate 73 and then through the lens cover 70. The lens 50 focuses the light beam, which passes through the opening 31 of the lens holder 30. The light beam forms an image in an image-forming plane 5.

The method of adjusting the focal point of the optical lens 50 will be described, with reference to FIGS. 5B and 5C. FIG. 5B is a sectional view, explaining how the optical lens unit 20 is operated to set the focal point at a long distance. FIG. 5C is a sectional view, too, explaining how the unit 20 is operated to set the focal point at a short distance.

To adjust the focal point in position, the focal point adjusting slide plate 73 is moved in a plane that extends at right angles to the optical axis 3 of the optical lens 50 (or to the left or right in FIGS. 5B and 5C). When the plate 73 is moved to the right as shown in FIG. 5B, it applies a force to the lens cover 70, pushing the same downwards. In this case, the lens fastener 60 pushes the optical lens 50 toward the flange 33 of the lens holder 30. Thus pushed, the optical lens 50 compresses the cushion 40. Conversely, when the plate 73 is moved to the left as illustrated in FIG. 5C, the force applied to the lens cover 70 decreases, whereby the lens cover 70 moves up. The cushion 40 therefore expands, pushing the optical lens 50 upward from the flange 33 toward the lens cover 70. Thus, the focal point of the lens 50 can be adjusted in position on the optical axis 3 of the lens 50.

In the focal point adjusting method described with reference to FIGS. 5B and 5C, the focal point adjusting slide plate 73 is moved in the plane extending at right angles to the optical axis 3, thereby to adjust the focal point of the optical lens 50. Hence, it is possible to adjust the focal point more minutely by decreasing the angle at which the surfaces 72 and 74 are inclined to the optical axis 3.

In the fourth embodiment, the focal point adjusting slide plate 73 has a window through which a light beam may pass to the optical lens 50. The slide plate 73 need not have a window if it is made of a material transparent to light.

Figure 5D:
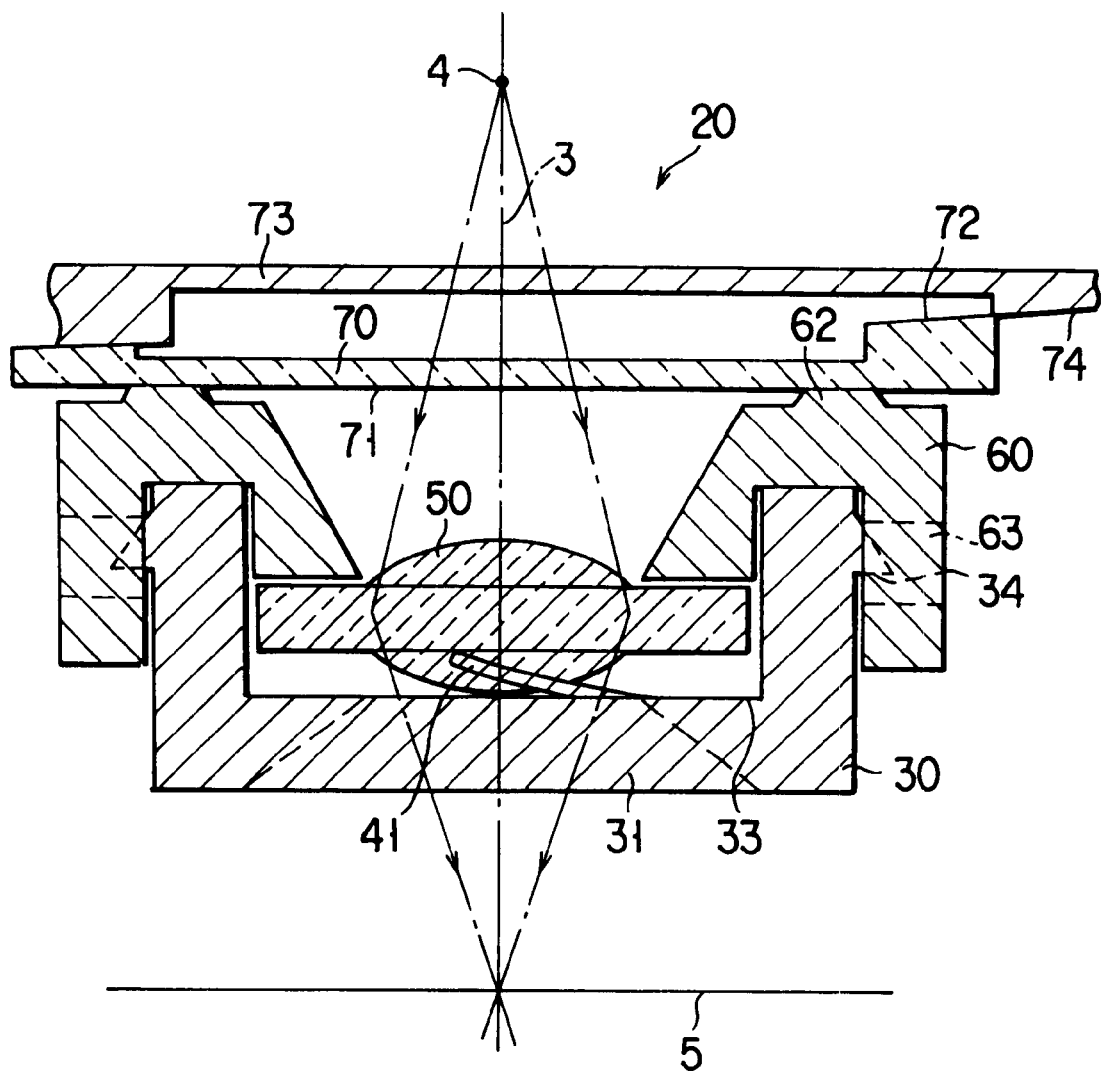
FIG. 5D is an exploded view of a modification of the fourth embodiment of the invention.

The cushion 40 is used in the fourth embodiment (FIGS. 5A to 5C). The fourth embodiment may be modified as illustrated in FIG. 5D. In the modification of FIG. 5D, the cushion 40 is replaced by springs 41 of the same type as incorporated in the third embodiment.

Figure 6A:
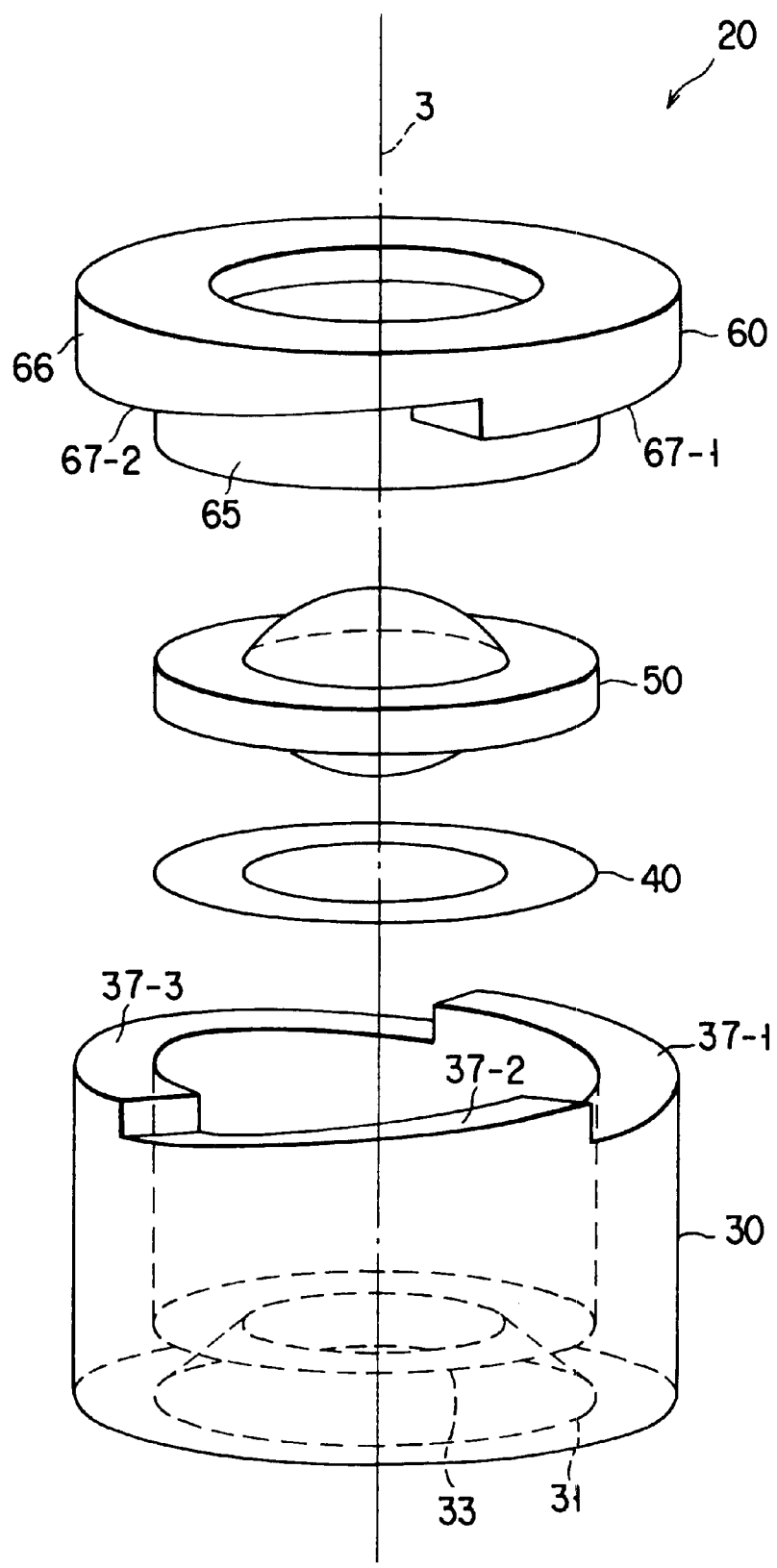
FIG. 6A is an exploded view of a section of an optical lens unit according to a fifth embodiment of the present invention.
Figure 6B:
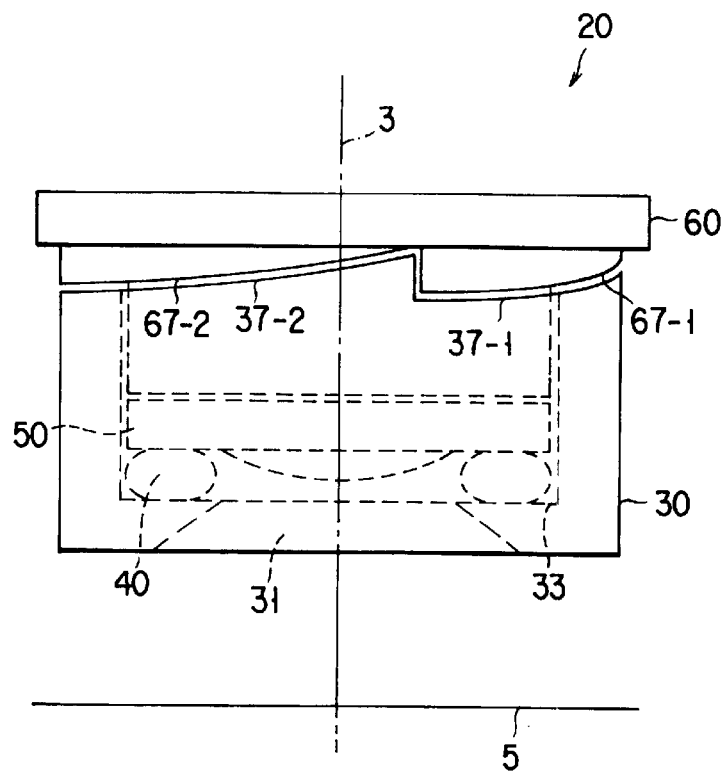
FIGS. 6B and 6C are sectional views, respectively explaining how the unit of FIG. 6A is operated to set the focal point at a long distance and a short distance.
Figure 6C:
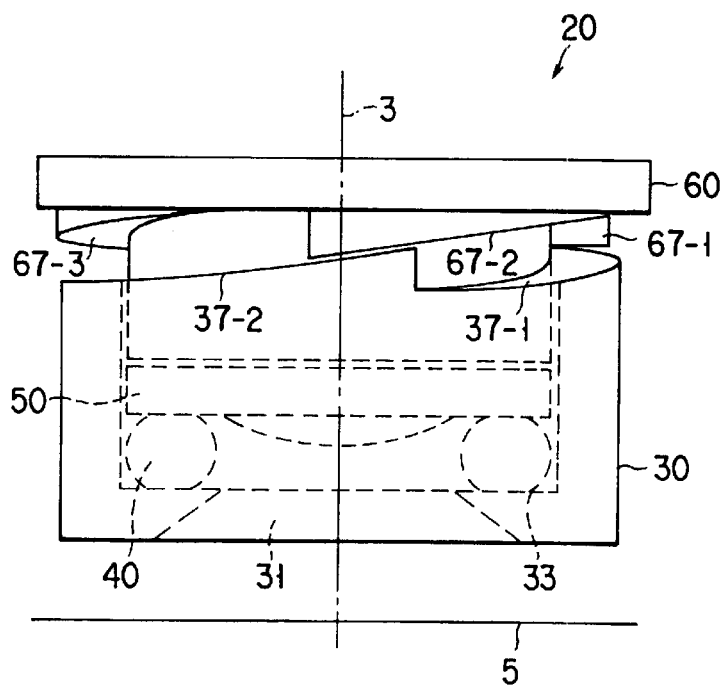

An optical lens unit 20 according to the fifth embodiment of this invention will be described, with reference to FIGS. 6A to 6C. Like the fourth embodiment, the fifth embodiment has a focal point adjusting mechanism that uses no screws at all. The fifth embodiment is concerned with a technique of controlling the pushing force applied to a cushion 40. FIG. 6A is an exploded view of a section of the fifth embodiment. FIGS. 6B and 6C are sectional views of the fifth embodiment.

In the fifth embodiment, the lens fastener 60 is rotated to generate a force to push the cushion 40. In this respect the fifth embodiment differs from the fourth embodiment in which the focal point adjusting slide plate 73 is moved in a horizontal direction to push the cushion 40.

As shown in FIG. 6A, the lens holder 30 is a hollow cylinder that has an opening 31 in the bottom. It has three inclined surfaces 37-1, 37-2 and 37-3 its top. The surfaces 37-1 to 37-3 have arcuate shape in a range below 360 degree.

The cushion 40 has a refractive index similar to that of the optical lens 50. The cushion 40 is a black light-absorbing body that is elastic. It is shaped like a ring and functions as a seal. It is mounted on the bottom (or flange 33) of the lens holder 30. Functioning as a seal, the cushion 40 remains in close contact with the flange 33 of the lens holder 30.

The optical lens 50 has a collar. The lens 50 is provided on the flange 33 of the lens holder 30, with its collar held in contact with the cushion 40. The optical lens 50 is arranged with its optical axis 3 aligned with the center of the opening 31 of the lens holder 30. Note that the cushion 40 is set in contact with the collar of the optical lens 50.

The lens fastener 60 is a hollow cylinder. The fastener 60 is composed of at least two sections. For example, it consists of a small-diameter section 65 and a large-diameter section 66, which will be hereinafter referred to as "first section" and "second section," respectively. The first section 65 has an outer diameter equal to the inner diameter of the lens holder 30. The lower end of the first section 65 abuts on the collar of the optical lens 50. The second section 66 has three inclined surfaces on its lower end. (Of the three inclined surfaces, only two surfaces 67-1 and 63-2 are shown in FIGS. 6A and 6C.) The surfaces 67-1 to 67-3 have arcuate shape in a range below 360 degree. As shown in FIG. 6B, the first section 65 is inserted in the lens holder 30, while the three inclined surfaces abuts on the three inclined surfaces of the lens holder 30, respectively. (Only two inclined surfaces 37-1 to 37-3 are shown in FIGS. 6B and 6C.) The first section 65 of the lens fastener 60 and the cushion 40 mounted on the flange 33 of the lens holder 30 clamp the collar of the optical lens 50, whereby the lens 50 is held in the lens holder 30.

The optical lens 50 focuses any light beam incident to it. The light beam passes through the opening 31 of the lens holder 30, forming an image in an image-forming plane 5.

The method of adjusting the focal point of the optical lens 50 will be described, with reference to FIGS. 6B and 6C. FIG. 6B is a sectional view, explaining how the optical lens unit 20 is operated to set the focal point at a long distance. FIG. 6C is a sectional view, too, explaining how the unit 20 is operated to set the focal point at a short distance.

To adjust the focal point in position, the lens fastener 60 is rotated around the optical axis 3 of the lens 50. As the lens fastener 60 is so rotated, it moves relative to the lens holder 30, along the optical axis 3 of the lens 50. More precisely, when the lens fastener 60 is rotated clockwise, it pushes the optical lens 50 downwards while its inclined surfaces 67-1 to 67-3 are sliding in one direction on the inclined surfaces 37-1 to 37-3 of the lens holder 30, respectively. The optical lens 50 compresses the cushion 40 as is illustrated in FIG. 6B. Namely, the optical lens 50 moves toward the flange 33 of the lens holder 30. Therefore, the focal point of the lens 50 is set at a long distance from the optical lens unit 20. On the other hand, when the lens fastener 60 is rotated counterclockwise, it pulls the optical lens 50 upwards while the inclined surfaces 67-1 to 67-3 are sliding in the other direction on the inclined surfaces 37-1 to 37-3 of the lens holder 30, respectively. The optical lens 50 allows the cushion 40 to expand as is illustrated in FIG. 6C. The cushion 40 pushes up the optical lens 50, which moves away from the flange 33 of the lens holder 30 toward the lens fastener 60. In this case, the focal point of the lens 50 is set at a short distance from the optical lens unit 20. Thus, the focal point of the lens 50 can be adjusted in position on the optical axis 3 of the lens 50.

Figure 6D:
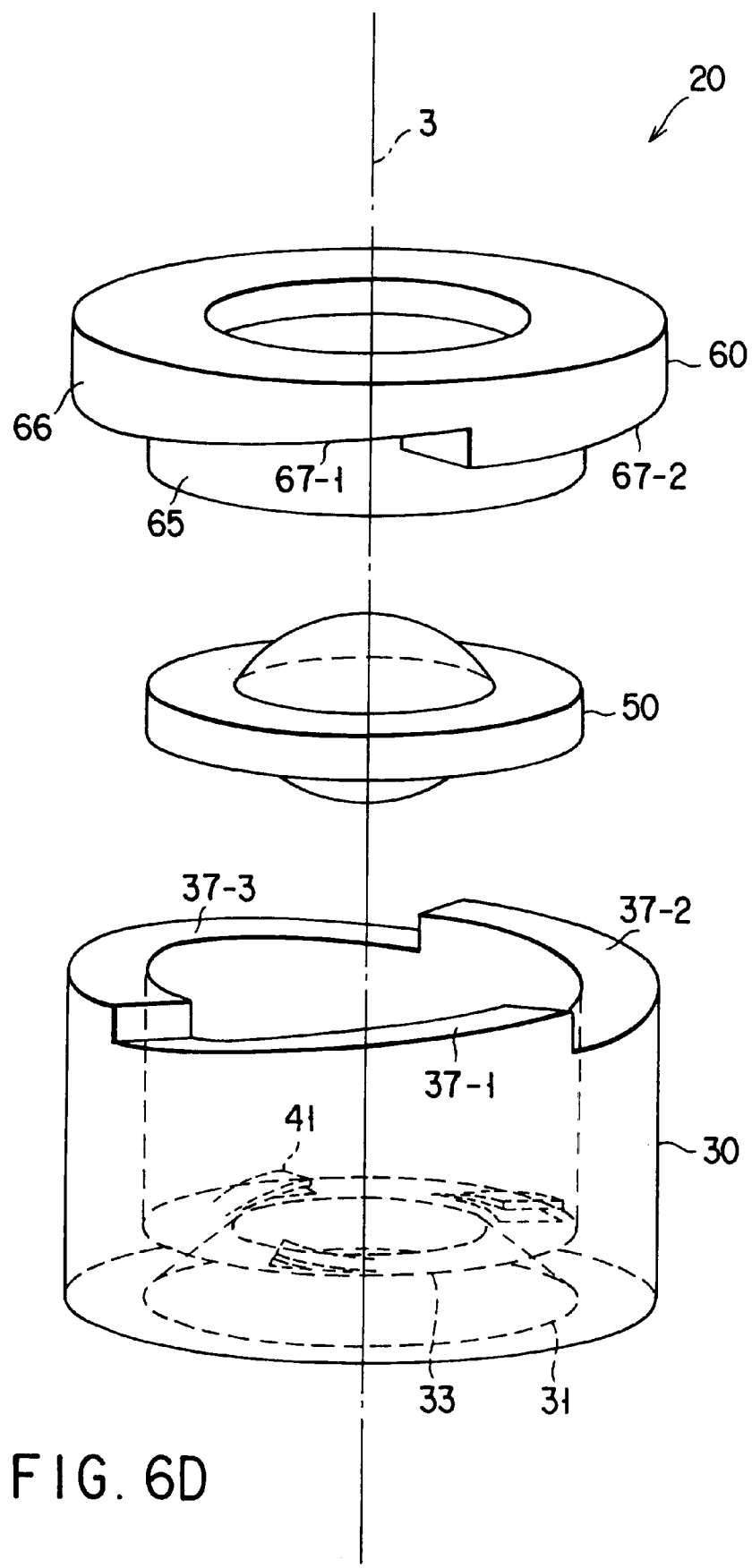
FIG. 6D is an exploded view of a section of a modification of the fifth embodiment of the invention.

In this method, too, it is possible to control the pushing force applied to a cushion 40. The cushion 40 can of course be replaced by springs 41 of the same type as incorporated in the third embodiment, as is illustrated in FIG. 6D.

Figure 7A:
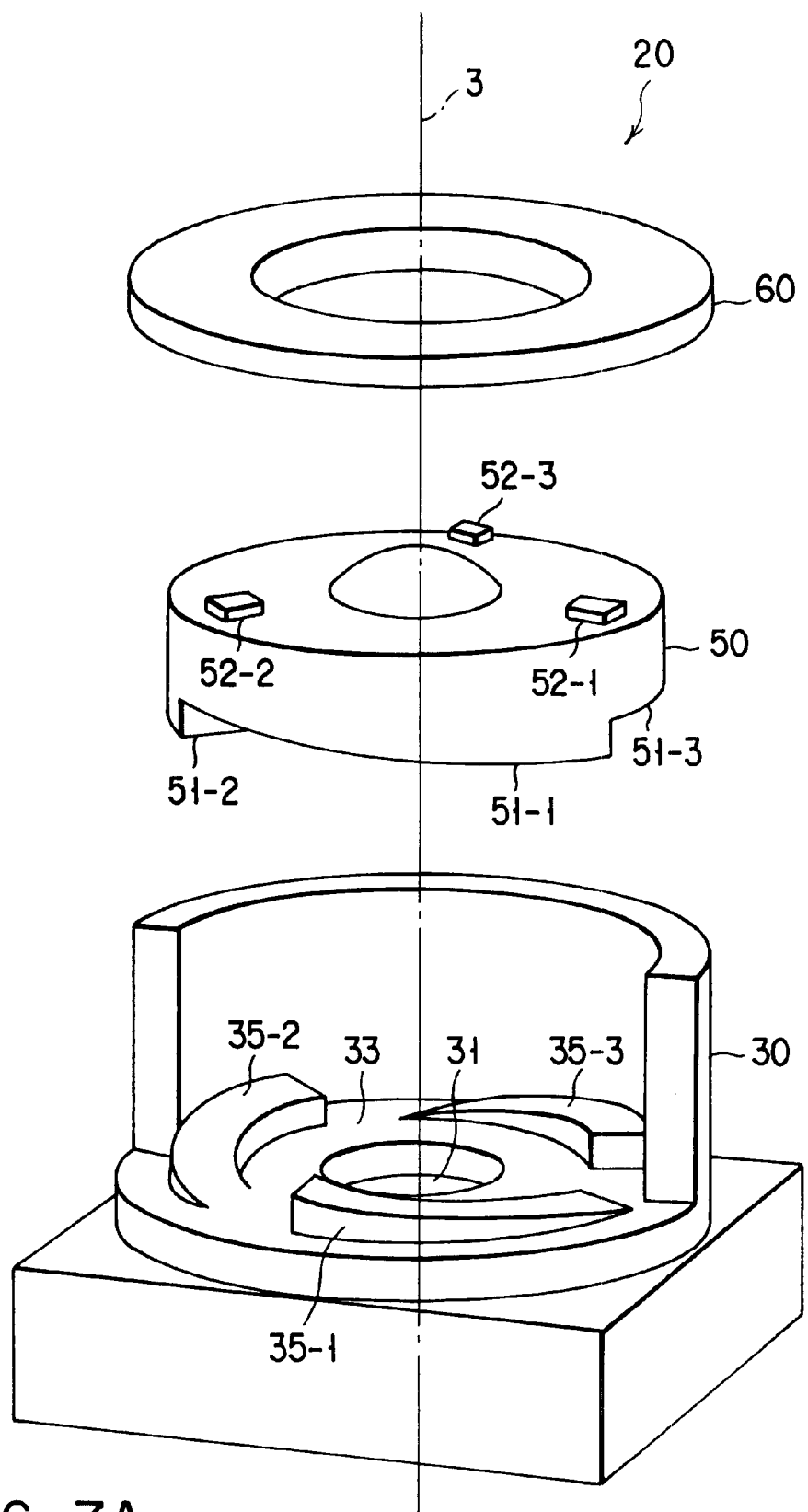
FIG. 7A is an exploded view of a section of an optical lens unit according to a sixth embodiment of the invention.
Figure 7B:
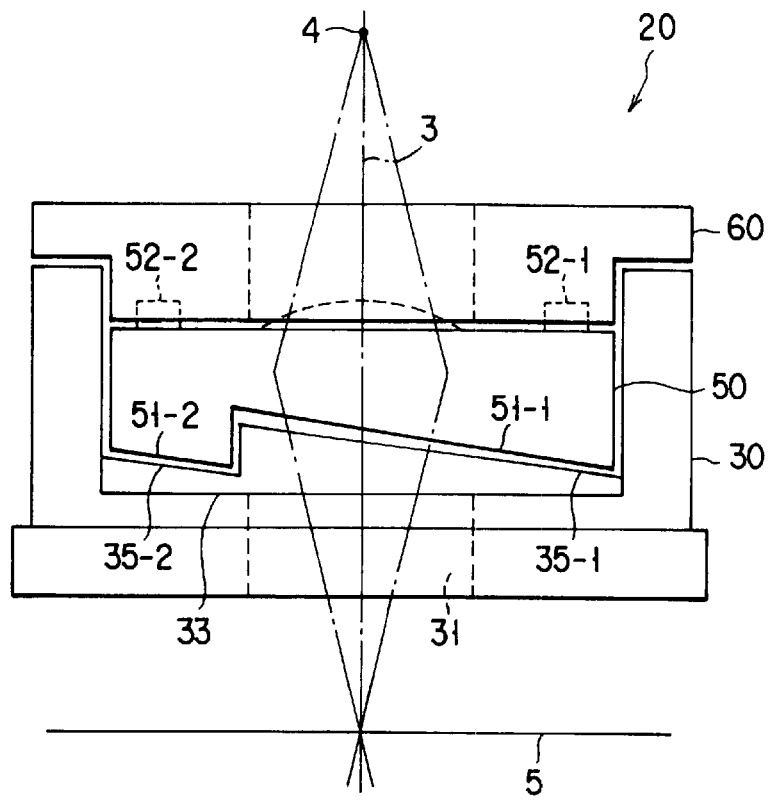
FIGS. 7B and 7C are sectional views, respectively explaining how the unit of FIG. 7A is operated to set the focal point at a long distance and a short distance.
Figure 7C:
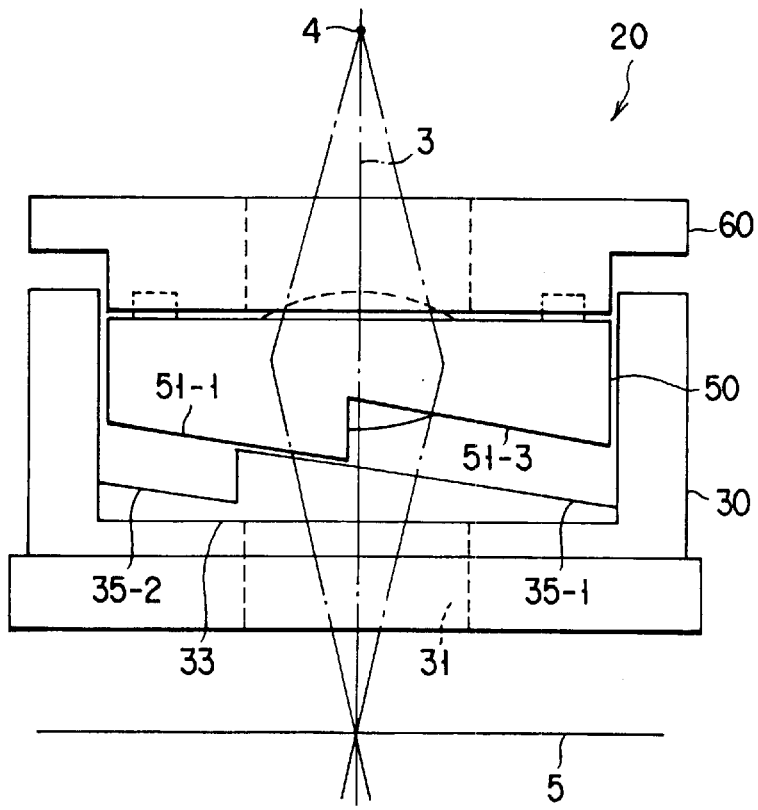

An optical lens unit 20 according to the sixth embodiment of the present invention will be described, with reference to FIGS. 7A to 7C. FIG. 7A is an exploded view of a section of the sixth embodiment. FIGS. 7B and 7C are sectional views of the sixth embodiment.

The sixth embodiment does not use elastic members (cushions or springs) as in the first to fifth embodiments. Nor does it have a screw-type rotating mechanism for adjusting a focal point.

As FIG. 7A shows, the optical lens unit 20 according to the sixth embodiment comprises a lens holder 30, an optical lens 50, and a lens fastener 60.

The lens holder 30 is a hollow cylinder. It has an opening 31 in the bottom and three projections 35-1 to 35-3 on the bottom (or flange 33). The projections 35-1 to 35-3 are arranged in a circle. Each of the projections 35-1 to 35-3 has an inclined surface at the top. The top surfaces of the projections 35-1 to 35-3 have arcuate shape in a range below 360 degree.

The optical lens 50 has a collar. The collar of the lens 50 has three inclined surfaces 51-1 to 51-3 on its lower side that contacts the flange 33. The surfaces 51-1 to 51-3 have arcuate shape in a range below 360 degree. The collar has three projections 52-1 to 52-3 on its upper side that faces the lens fastener 60. The projections 52-1 to 52-3 are arranged in a circle and spaced almost equidistantly from one another. The optical lens 50 is positioned in the lens holder 30, with the inclined surfaces 51-1 to 51-3 abutting on the projections 35-1 to 35-3 provided on the flange 33.

The lens fastener 60 is a hollow cylinder. As shown in FIGS. 7B and 7C, the lens fastener 60 is composed of a small-diameter section and a large-diameter section. The large-diameter section is mounted on the small-diameter section, formed integral therewith and arranged coaxial thereto. The small-diameter section has three depressions in its lower surface. The projections 52-1 to 52-3 of the lens 50 are fitted in the depressions, thus preventing the lens fastener 60 from rotating with respect to the optical lens 50.

As shown in FIGS. 7B and 7C, a light source 4 emits a light beam, incident to the optical lens 50. The lens 50 focuses the light beam, which passes through the opening 31 of the lens holder 30. The light beam forms an image in an image-forming plane 5.

The method of adjusting the focal point of the optical lens 50 will be described, with reference to FIGS. 7B and 7C. FIG. 7B is a sectional view, explaining how the optical lens unit 20 is operated to set the focal point at a long distance. FIG. 7C is a sectional view, too, explaining how the unit 20 is operated to set the focal point at a short distance.

In order to adjust the focal point in position, the lens fastener 60 is rotated around the optical axis 3 of the lens 50. As the lens fastener 60 is rotated, the optical lens 50 rotates, too. This is because the projections 52-1 to 52-3 of the lens 50 are fitted in the depressions that are made in the lower surface of the lens fastener 60. When the lens fastener 60 is rotated clockwise, the optical lens 50 rotates in the same direction from the position shown in FIG. 7B. As the lens 50 so rotates, its inclined surfaces 51-1 to 51-3 slide clockwise on the projections 35-1 to 35-3 of the lens holder 30, respectively. As a result, the optical lens 50 moves upwards, as shown in FIG. 7C. Therefore, the focal point of the lens 50 is set at a short distance from the optical lens unit 20. On the other hand, when the lens fastener 60 is rotated counterclockwise, the optical lens 50 rotates from the position shown in FIG. 7C. As the lens 50 so rotates, its inclined surfaces 51-1 to 51-3 slide counterclockwise on the projections 35-1 to 35-3 of the lens holder 30, respectively. In this case, the optical lens 50 moves downwards, as shown in FIG. 7B. Therefore, the focal point of the lens 50 is set at a long distance form the optical lens unit 20. Thus, the focal point of the lens 50 can be adjusted in position on the optical axis 3 of the lens 50.

As mentioned above, the sixth embodiment does not use elastic members (cushions or springs). Hence, the optical lens unit 20 according to the sixth embodiment can have a simple structure. It follows that the sixth embodiment can be manufactured at low cost and assembled with high precision.

Figure 8A:
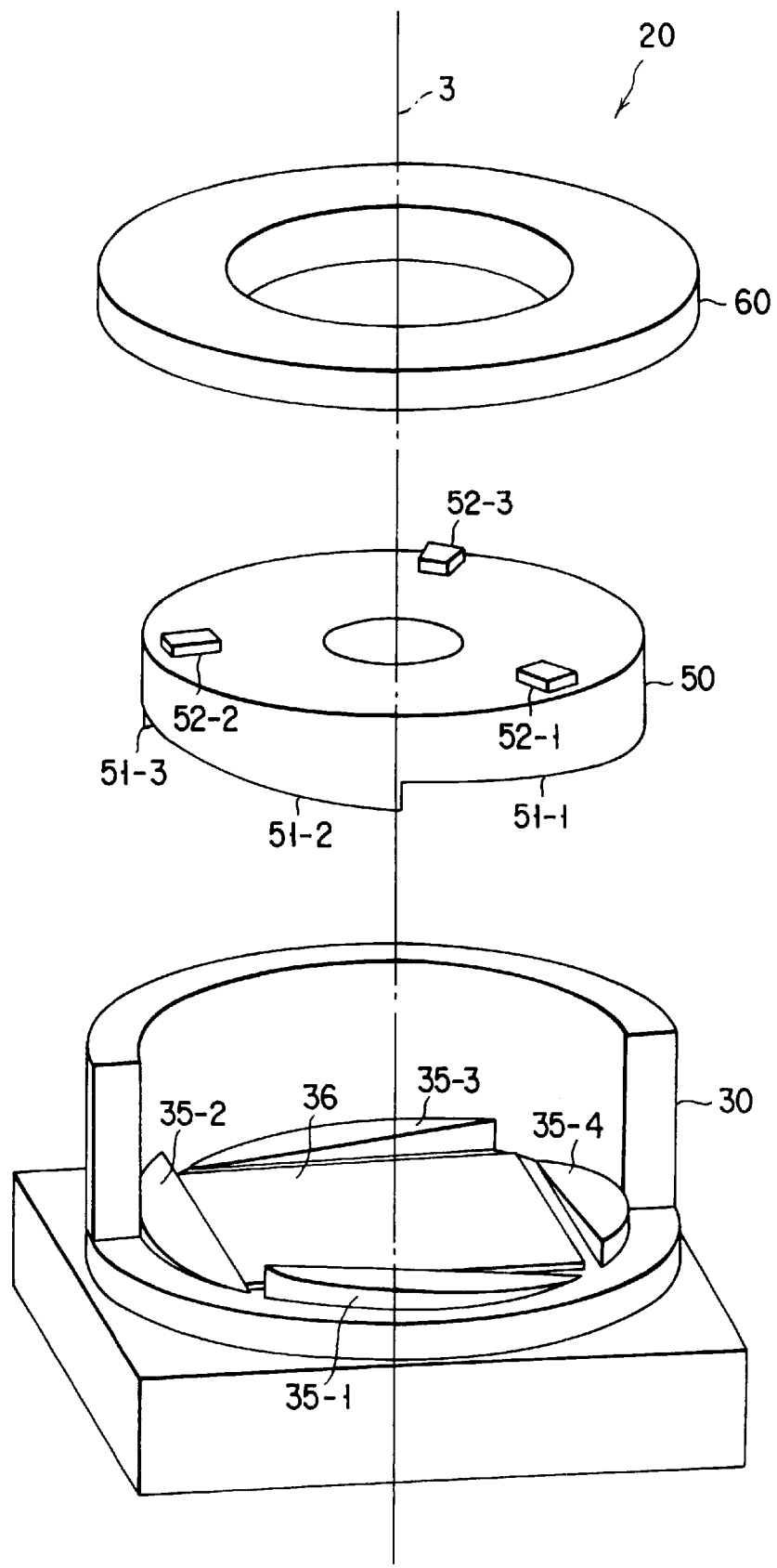
FIGS. 8A and 8B are exploded views of the optical lens unit according to a seventh embodiment of this invention.
Figure 8B:
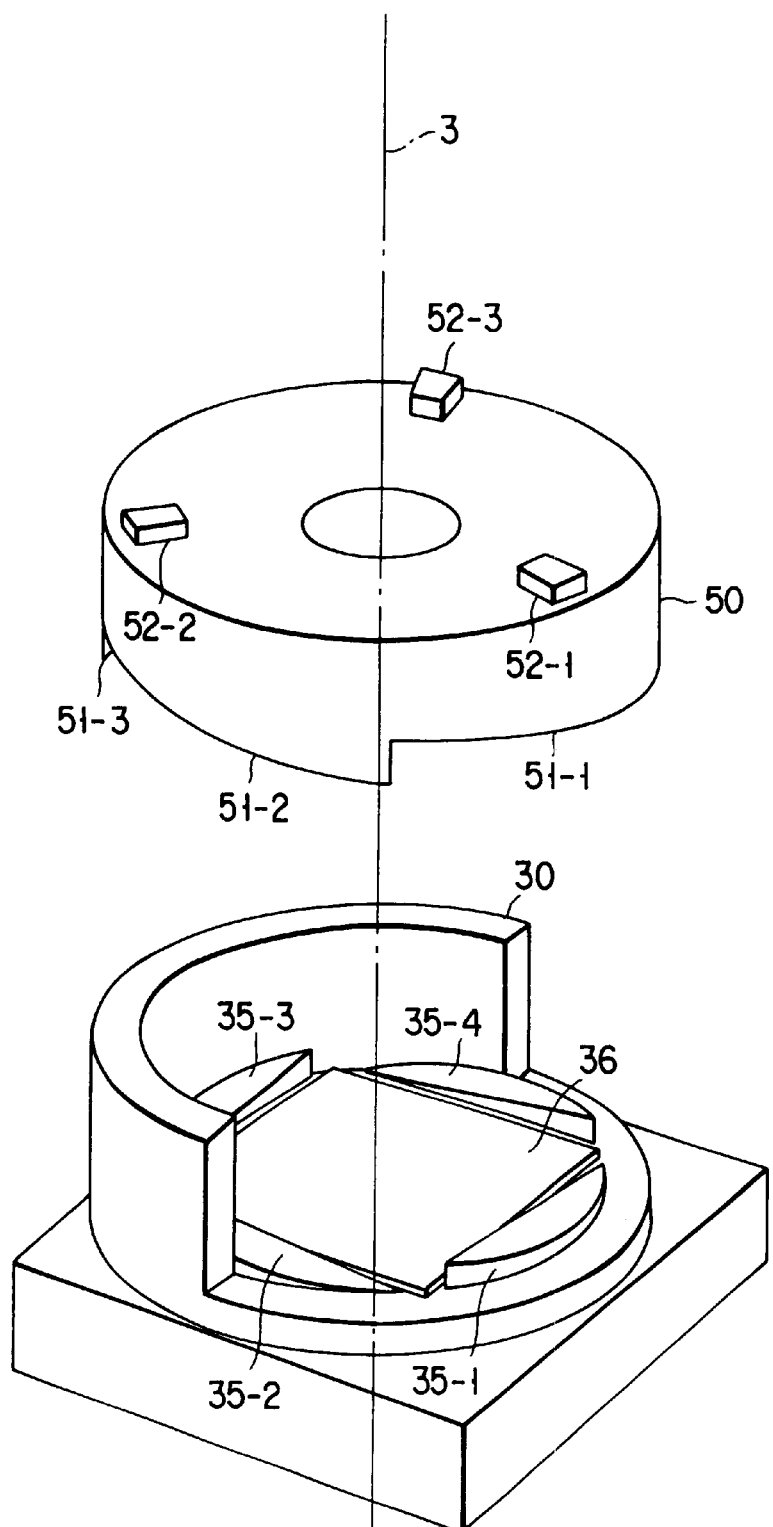

An optical lens unit 20 according to the seventh embodiment of the invention will be described, with reference to FIGS. 8A to 8C. FIG. 8A is an exploded view of this embodiment. FIG. 8B is an exploded view of a part of the unit 20 as viewed in a different direction.

According to the seventh embodiment, an optical filter allows passage of some components of the coming light, whose wavelengths fall within a specific range.

As FIGS. 8A and 8B show, this optical lens unit 20 comprises a lens holder 30, an optical filter 36, an optical lens 50, and a lens fastener 60. The lens holder 30 has a hollow cylindrical section having an opening 31 in the bottom (or flange 33). The optical filter 36 is laid on the flange 33, closing the opening 31. Four projections 35-1 to 35-4 are provided on the flange 33. They are arranged at the four sides of the optical filter 36, respectively, thus surrounding the optical filter 36. Each of the projections 35-1 to 35-4 has an inclined surface at the top.

The optical lens 50 has a collar. The lens 50 is provided on the flange 33 of the lens holder 30. The collar of the lens 50 has four inclined surfaces 51-1 to 51-4 on its lower side. (Only three of these surfaces, 51-1 to 5-3, are shown in FIGS. 8A and 8B.) The surfaces 51-1 to 51-4 have arcuate shape in a range below 360 degree. The collar has three projections 52-1 to 52-3 on its upper side that faces the lens fastener 60. The projections 52-1 to 52-3 are arranged in a circle and spaced almost equidistantly from one another. The optical lens 50 is positioned in the lens holder 30, with the inclined surfaces 51-1 to 51-4 abutting on, respectively, the projections 35-1 to 35-4 provided on the flange 33 of the lens holder 30.

The four projections 35-1 to 35-4 provided on the flange 33 bring forth an advantage, which will be described below.

Generally, an optical lens unit incorporates an optical filter. The optical lens unit is a cylindrical device, whereas most optical filters available at low price are square plates. The optical filter 36 should better be a disc-shaped one since the flange 33 is a disc. To reduce the manufacturing cost of the unit 20, however, it is desirable to use a square optical filter that is cheap.

The optical filter 36 should not be provided between the lens holder 30 and an image-forming plane 5. This is because dust may be generated at the edges of the optical filter 36. It is therefore better to position the optical filter 36 outside the space in which the image-forming plane 5, or a photosensor, is arranged.

In the seventh embodiment, the optical filter 36, which is a square component, is mounted on the flange 33, and the four projections 35-1 to 35-4 are arranged at positions where the optical filter 36 does not overlap the flange 33. Thus, the seventh embodiment fulfills the above-mentioned two requirements, i.e., the use of a square optical filter, and the position thereof being outside the space in which the image-forming plane 5 exists.

It is important to arrange the projections 35-1 to 35-3 outside the square optical filter 36 in the seventh embodiment. How many projections should be provided is not so important. Therefore, the number of the projections is not limited to four, though it is best to provide four projections.

Figure 9A:
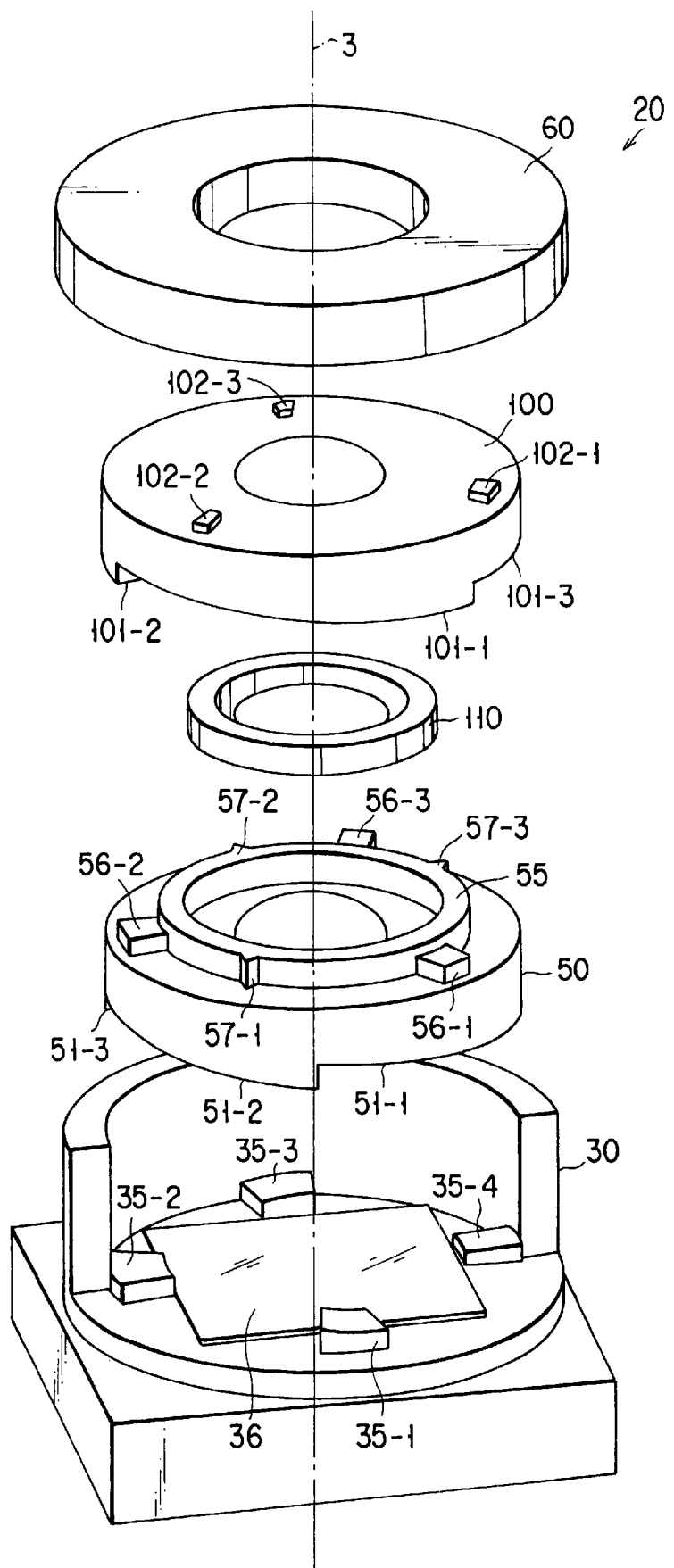
FIG. 9A is an exploded view of the optical lens unit according to an eighth embodiment of the invention.
Figure 9B:
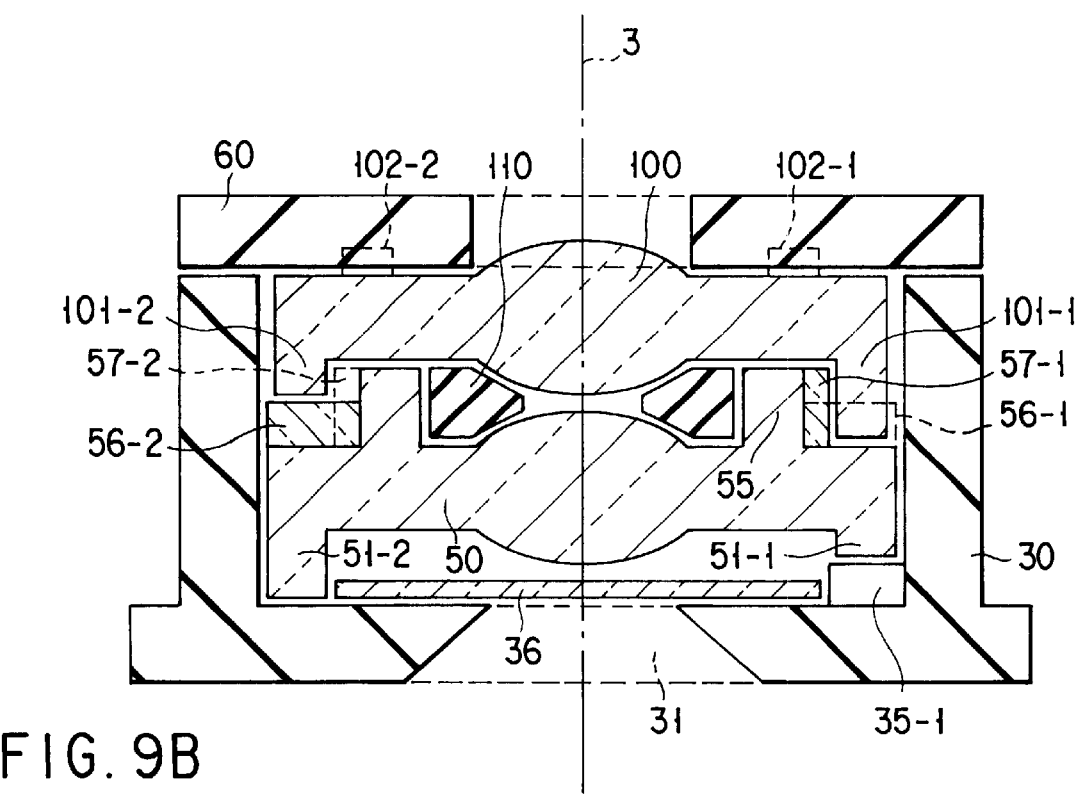
FIG. 9B is a sectional view of the optical lens unit shown in FIG. 9A.

An optical lens unit, which is the eighth embodiment of the invention will be described, with reference to FIGS. 9A and 9B. FIG. 9A is an exploded view of the eighth embodiment that has a mechanism for adjusting the position of the focal point. FIG. 9B is a sectional view of the eighth embodiment. The eighth embodiment is identical to the seventh embodiment, except that it incorporates an additional optical lens.

As FIGS. 9A and 9B show, the lens holder 30 is a hollow cylinder. The lens holder 30 has an opening 31 in the bottom 33. The opening 31 is coaxial with the optical axis 3 of the lens unit. An optical filter 36 is mounted on the bottom (i.e., flange 33) of the lens holder 30, covering the opening 31. The lens holder 30 has four projections 35-1 to 35-4, which protrude from the flange 33 and surround the optical filter 36.

The optical lens 50 has a collar. The collar has four inclined surfaces on the lower side. (In FIG. 9A, only three of the arcuate inclined surfaces, 51-1, 51-2 and 51-3, are illustrated.) The four inclined surfaces contact the projections 35-1 to 35-4 of the lens holder 30. The optical lens 50 has a ring-shaped guide 55 on the upper side of the collar. The guide 55 is positioned coaxial to the optical axis of the optical lens 50. The guide 55 has three acute projections 57-1 to 57-3 that extend outwards from the outer circumferential surface. Three projections 56-1 to 56-3 protrude from the upper side of the collar, surrounding the guide 55.

The eighth embodiment has an additional optical lens 100. The lens 100 is mounted on the optical lens 50 and positioned coaxial therewith. The additional optical lens 100 has a collar. The collar has three inclined surfaces 101-1 to 101-3, which contact the projections 56-1 to 56-3 of the optical lens 50. As seen from in FIG. 9B, the inclined surfaces 101-1 to 101-3 are provided on the lower side of the collar, only at the peripheral part of the lower side. In other words, the inclined surfaces 101-1 to 101-3 are the surfaces of three projections provided on the lower peripheral part of the collar. Further, three projections 102-1 to 102-3 are provided on the upper side of the collar of the additional optical lens 100. The additional optical lens 100 is combined with the optical lens 50, with the guide 55 surrounded by the inclined surfaces 101-1 to 101-3 of the additional optical lens 100. The guide 55 does not directly contact the projections having the inclined surfaces 101-1 to 101-3, because guide 55 has three projections 57-1 to 57-3. Only the tips of the acute projections 57-1 to 57-3 contact the projections having the inclined surfaces 101-1 to 101-3.

A ring 110 is interposed between the optical lens 50 and the additional optical lens 100. The ring 110 is a light absorber and is surrounded by the ring-shaped guide 55. It contacts both lenses 50 and 100. It absorbs the light incident to the collar of the additional optical lens 100.

The lens faster 60 has an opening, through which the optical axis of the lens unit extends. The lens fastener 60 is mounted on the additional optical lens 100. It has recesses in the lower side, in which the projections 102-1 to 102-3 of the lens 100 are fitted.

The focal point is adjusted in position in the eighth embodiment, in the same way as has been described with reference to FIGS. 7B and 7C in conjunction with the sixth embodiment. That is, the optical lens 50 is rotated around the optical axis, with the four inclined surfaces 51-1 to 51-4 held in contact with the projections 35-1 to 35-4 of the lens holder 30. Thus, the optical lens 50 moves along the optical axis of the optical lens unit. Similarly, the additional optical lens 100 is rotated around the optical axis, with the three inclined surfaces 101-1 to 101-3 held in contact with the projections 56-1 to 56-3 of the optical lens 50. The optical lens 50 therefore moves along the optical axis of the optical lens unit.

The two optical lenses 50 and 100 can easily aligned with the optical axis of the optical lens unit, because the optical lens 50 has a ring-shaped guide 55 and the guide 55 has projections 57-1 to 57-3. The reason why will be explained below in detail.

Generally, optical lenses are manufactured in two steps. In the first step, a molding is prepared by using a metal mold. In the second step, the molding is processed by the use of a lathe, forming desired curved surfaces and, in the case of the lens 50, forming the ring-shaped guide 55. In the lathe process, the molding is continuously rotated around a specific axis. This axis is substantially identical to the optical axis of the resultant optical lens. The ring-shaped guide 55, which is formed by lathe coaxially with the optical curved surfaces, is therefore coaxial with the shaft of the lathe, i.e., the optical axis of the lens 50. Hence, if the additional optical lens 100 is manufactured by using coaxial mold, it will have its optical axis aligned with that of the lens 50 when it is mounted on the guide 55. Thus, the guide 55 makes it easy to set the two optical lenses 50 and 100 in axial alignment. This advantage is particularly prominent in small diameter optical lens units, where optical curvature radius is small and relative misalignment against lens diameter has considerable effects on the lens performance. In a large optical lens unit, the lenses optical curvature radius is large and are not so severe against micrometer order optical axis misalignment.

The guide 55 does not directly contact the projections having the inclined surfaces 101-1 to 101-3. The acute tips of the projections 57-1 to 57-3 do contact the projections having the inclined surfaces 101-1 to 101-3. The stress applied between the optical lens 50 and the additional optical lens 100 can therefore be reduced. If the guide 55 directly contacted the projections having the inclined surfaces 101-1 to 101-3, a great force would be applied between the lenses 50 and 100, and either the lens 50 or the lens 100 would be ultimately deformed from the optimized original optical design. Should it happen, the guide 55 could no longer serve to set the lenses 50 and 100 into axial alignment and achieve designed optical performance. If a large stress is applied to the lens 50 or 100, only the tip of the projections 57-1 to 57-3 will evenly collapse, absorbing the stress. Thus, the two optical lenses 50 and 100 remain coaxially aligned with each other.

In the eighth embodiment, the ring 110, which is a light absorber, is interposed between the optical lens 50 and the additional optical lens 100. The ring 110 absorbs the excess stray light incident to the collar of the optical lens 50. This prevents the stray light from influencing the image formed in the image-forming plane of the optical lens unit.

Figure 9C:
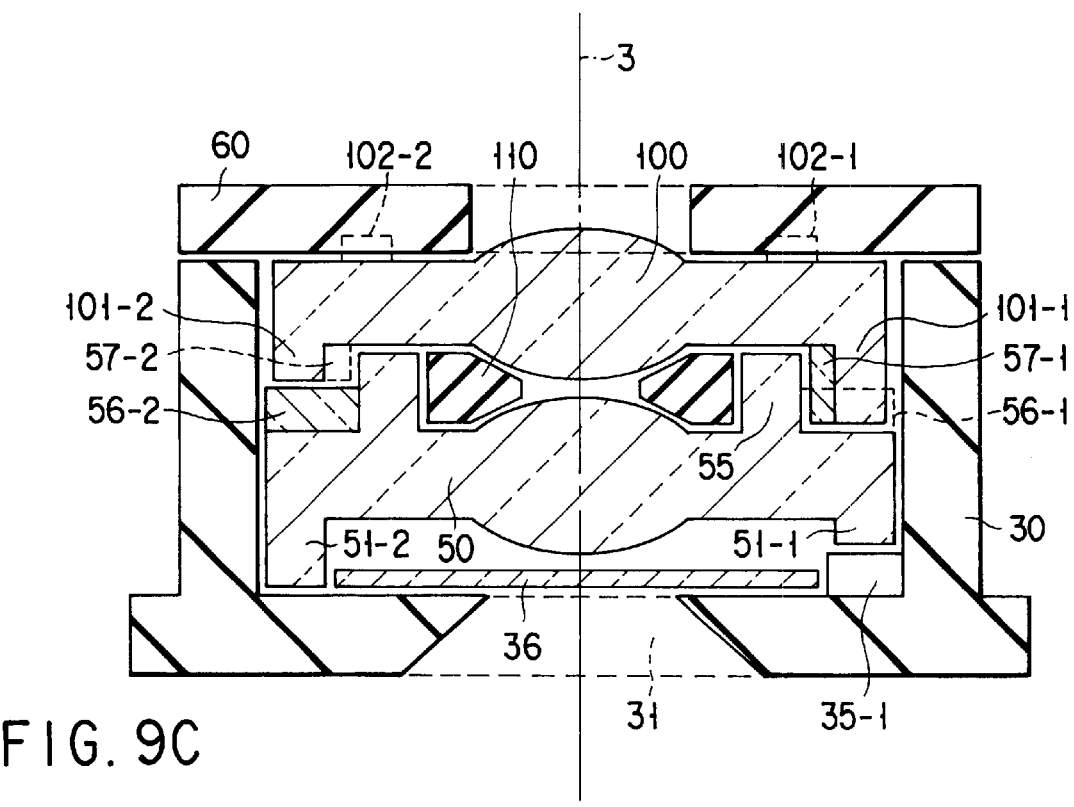
FIG. 9C is a sectional view of a modification of the optical lens unit illustrated in FIG. 9A.

As shown in FIG. 9C, the projections 57-1 to 57-3 may be provided on the inner circumferential surface of the projections having the inclined surfaces 101-1 to 101-3 of the additional optical lens 100. It suffices to provide the projections 57-1 to 57-3 at any positions, provided that they contact the inner or outer circumferential surface of the ring-shaped guide 55. Alternatively, the projections 56-1 to 56-3 may be provided on the lower side of the collar of the lens 100. In this case, the tops of the projections 56-1 to 56-3 contact the top of the guide 55, and the top of the guide 55 needs to have inclined surfaces similar to the surfaces 101-1 to 101-3.

As explained in conjunction with the first to eighth embodiments, the number of the components constituting the focal point adjusting mechanism is successfully reduced. This helps to miniaturize the optical lens unit and decrease the number of manufacturing steps thereof. In the first embodiment, for example, the cushion expands and contracts to adjust the focal point, though a screw-type rotating mechanism is employed. Thus, only a few components suffice to build the focal point adjusting mechanism. In addition, the space accommodating the screw-type rotating mechanism is separated from the space in which the image-forming plane exists. Dust, if generated at the screw-type rotating mechanism or at the edges of the optical filter, is prevented from entering the space in which the image-forming plane exists. The image formed in the image-forming plane would have no black blemish caused by the dusts. Moreover, the cushion attenuates pseudo signals such as flare, enhancing the image contrast in the image-forming plane.

Figure 10A:
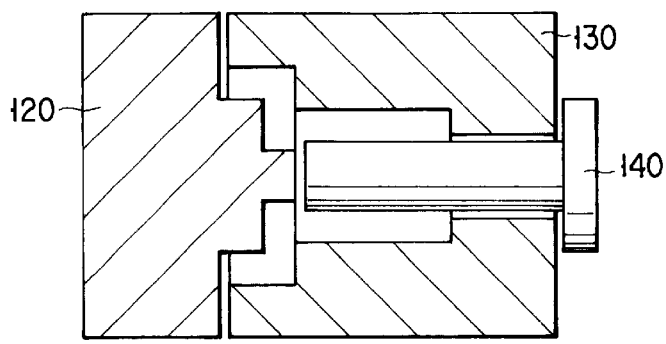
FIG. 10A is a sectional view of the mold for manufacturing the lens holder of the optical lens unit shown in FIG. 9A.
Figure 10B:
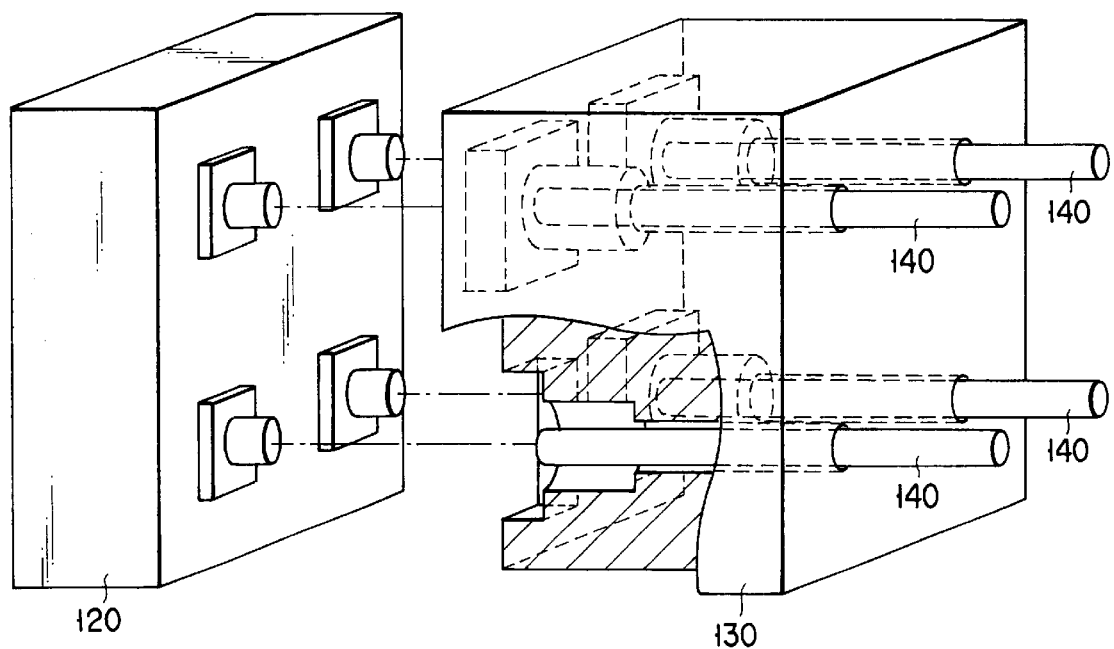
FIG. 10B is a perspective view of a mold for manufacturing a plurality of identical lens holders.

In the second embodiment, when the lens cover 70 is moved, it pushes the lens fastener 60, which in turn pushes the optical lens 50. Thus, a screw-type rotating mechanism is unnecessary to adjust the focal point. Without a screw-type rotating mechanism, the optical lens unit can be manufactured at a very low cost. Why this is possible will be explained, with reference to FIGS. 10A and 10B. FIG. 10A is a sectional view of the mold for manufacturing the lens holder 30. FIG. 10B is a perspective view of a mold for manufacturing a plurality of lens holders identical to the lens holder 30.

The mold shown in FIG. 10A is composed of three segments 120, 130 and 140. To manufacture the lens holder 30, the three segments 120, 130 and 130 are put together as illustrated in FIG. 10A, thus assembling the mold. The molten material is poured into the mold and cooled. When the material solidified, the mold is split into the segments 120, 130 and 140.

The segment 140 serves to provide a space in which the optical lens 50 is set. The segment 140 should have a screw on its circumferential surface if it were a part of the mold for manufacturing the lens holder of a conventional optical lens unit that has a screw-type rotation mechanism. If the segment 140 had a screw, it could not be removed from the solidified molding unless it is rotated by means of a rotation device.

The optical lens unit according to the embodiment of the invention has no screw-type rotating mechanisms. Hence, the segment 140 need not have a screw at all. It suffices to pull the segment 140 from the solidified molding. No rotation device needs to be used to remove the segment 140 from the molding. Since the segment 140 has no screw, the mold can be manufacture at a low cost and the method of manufacturing the lens holder 30 is much simpler than otherwise.

If the segment 140 had a screw as in the mold for manufacturing the lens holder of the conventional optical lens unit, it would undergo friction with the glass fiber or carbon fiber contained in the material of the lens holder 30 as it is rotated to be removed from the molding. Consequently, the segment 140 should wear, and the precision of the molding should decrease after the repeated use of the mold. Having no screw, the segment 140 can be smoothly pulled out of the molding and does not wear. Thus, the mold serves to manufacture the lens holder 30 with high precision and for much longer life time.

In practice, many identical lens holders are usually made by the use of a single mold. The mold shown in FIG. 10B is designed to manufacture four lens holders at a time. The conventional mold for manufacturing several lens holders has spaces in which rotation devices for rotating the segments 140. The devices are relatively large, each comprising some gears. The spaces for holding the devices are proportionally large. Consequently, the segments 140 cannot be arranged at narrow intervals, and the number of lens holders than can be molded by a single injection mold is limited. In the embodiment of the present invention, no rotation devices need to be employed to remove the segments 140 from the moldings, and the segments 140 can be arranged at short intervals. Hence, more lens holders can be molded at a single time than by the use of the conventional mold. This helps to reduce the manufacturing cost of the lens holders.

As mentioned above, the optical lens unit according to the invention has no screw-type rotating mechanisms. This serves to simplify the assembling of the optical lens unit and prevents variation in the inner diameter among the lens holder 30 which have been made by the repeated use of the mold. Further, no dust would be generated as the segment 140 is pulled from the molding. Thus, without a screw-type rotating mechanism, the optical lens unit can be manufactured at low cost and can be improved in terms of focal point adjusting ability.

In the third embodiment, the springs 41 are used in place of the cushion 40. Since the springs 41 are made integral with the flange 33, the optical lens unit comprises fewer components than otherwise. According to the embodiment of the present invention, any other elastic members replace the cushion 40. It is desired that the elastic member be black light absorbing body that has a refractive index similar to that of the optical lens 50. The elastic member absorbs the stray light coming to them. Thus, it prevents stray light from reaching the image-forming plane 5. The elastic member may be made of rubber or resin. Alternatively, it may be placed by springs of any type.

It is desired that such an elastic member be made of material that exhibits an elastic deformation ratio of larger than 10 to 100 to the optical lens 50 and lens fastener 60. If so, only the elastic member undergoes elastic deformation when the lens fastener 60 is moved to adjust the focal point in position. This serves to minimize the elastic deformation of the optical lens 50. Ultimately, the optical lens 60 can form a high-quality image.

To secure optical components in prescribed positions, elastic rings may be used. Elastic rings are used mainly to held plane filters that need not be positioned so precisely. Hitherto, they have been used to moderate the pressure holding the filters, i.e., the pressure applied to the components to which the filters are attached. That is, they have been used, not to adjust the focal point of an optical lens against the focal plane.

Unlike the elastic springs for holding filters in place, the cushion used in the embodiment of the present invention functions to shield the space defined by the optical lens and the image-forming plane. The cushion performs another function of applying a pressure uniformly to the circumferential part of the optical lens. Hence, the cushion helps to enhance the focal point adjusting ability of the lens unit and to improve the quality of the image formed by the lens unit.

In the fourth embodiment, the horizontal motion of the focal point adjusting slide plate 73 is converted to a force that moves the optical lens 50 up and down in the lens holder 30, thanks to the inclined surfaces provided on the lens cover 70 and slide plate 73. In the fifth embodiment, the rotation of the lens fastener 60 is converted to a force that moves the optical lens 50 up and down in the lens holder 30, by virtue of the inclined surfaces provided on the lens holder 30 and lens fastener 60. Hence, the focal point can be minutely adjusted in both the fourth embodiment and the fifth embodiment.

Image sensors for use in portable apparatus, such as mobile telephones, have become smaller in diameter, year by year. The optical lens used in such an image sensor is proportionally small. If a load is applied directly on the small lens, the lens unit and even the whole imaging module comprising the lens unit may be damaged. In the fourth and fifth embodiments of the present invention, the load on the optical lens 50 is small. This is because the optical lens 50 is neither pushed nor pulled directly. Rather, a force is applied to the focal point adjusting slide plate 73 to move the same in the fourth embodiment, and to the lens holder 60 to rotate the same in the fifth embodiment, thereby to move the optical lens 50.

It should be noted that the focal point is adjusted as described herein, to correct the focal distance of the lens 50, which differs from the design value, or by daily molding condition, or molding cavity difference, or by raw material environment history, as well as assembly tolerance of the lens unit onto the image sensor. Basically it is not aimed to bring every different image shot into focus.

In practice, lens focusing adjustment mechanism will benefit the assembly process of the imaging camera module comprising an image sensor with lens unit, because it can absorb all the tolerance related variation of the assembly process, thus enabling the use of cheaper and less precise assembly machinery in the camera module assembly process.

Figure 11A:
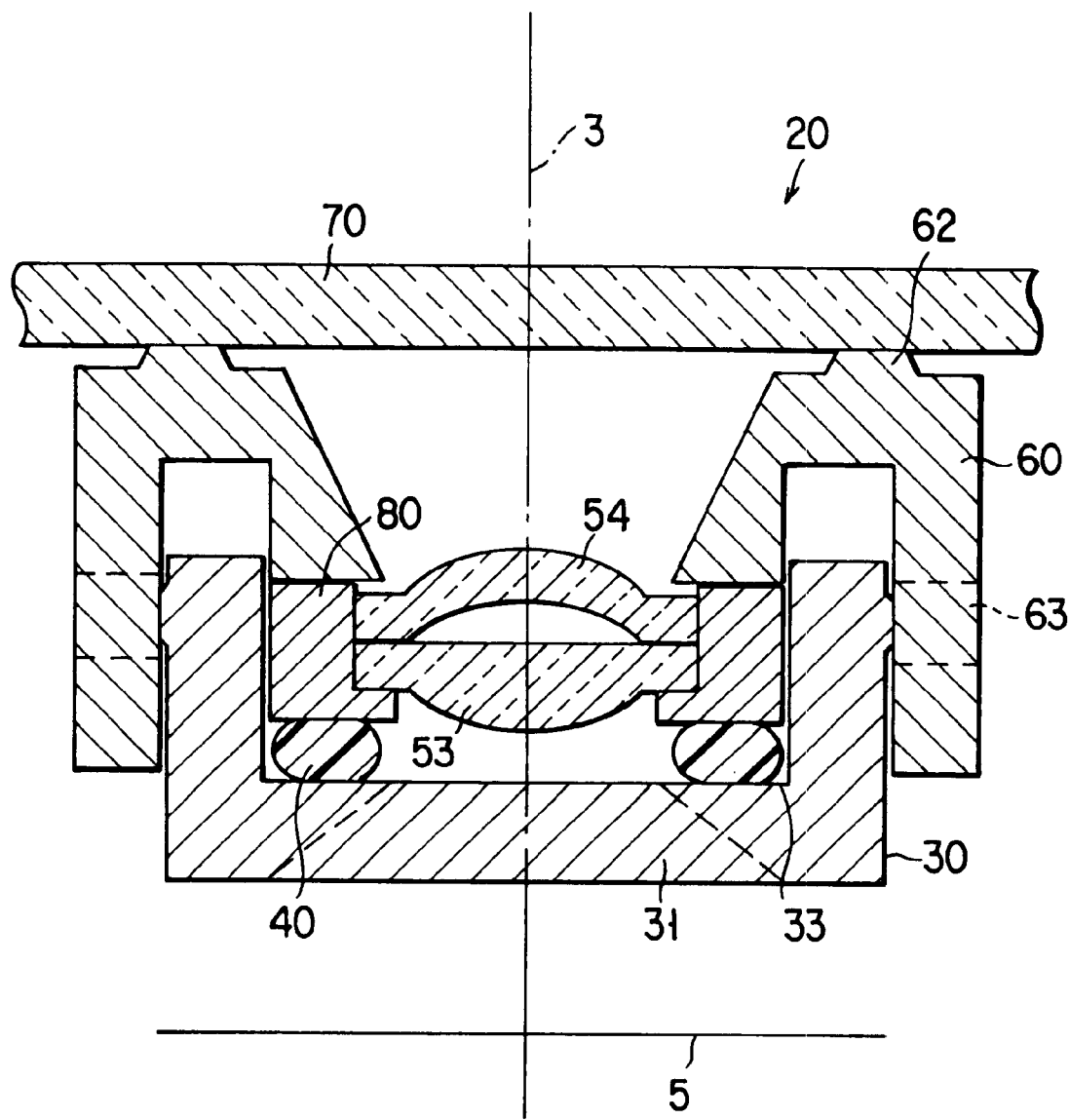
FIG. 11A is a sectional view of a first modification of the first to eighth embodiments of the invention.

The first to seventh embodiments have only one optical lens 50, because most of optical lens units for use in portable devices have one lens. Some types of lens unit for use in portable devices have a plurality of optical lenses. The embodiment of the present invention can be applied to an optical lens unit having two or more lens, too. FIG. 11A shows such an optical lens unit that is a modification of the first to seventh embodiments of the invention. As FIG. 11A shows, a holder 80 holds two optical lenses 53 and 54 together. The lenses 53 and 54 therefore moved together whenever the holder 80 is moved.

Figure 11B:
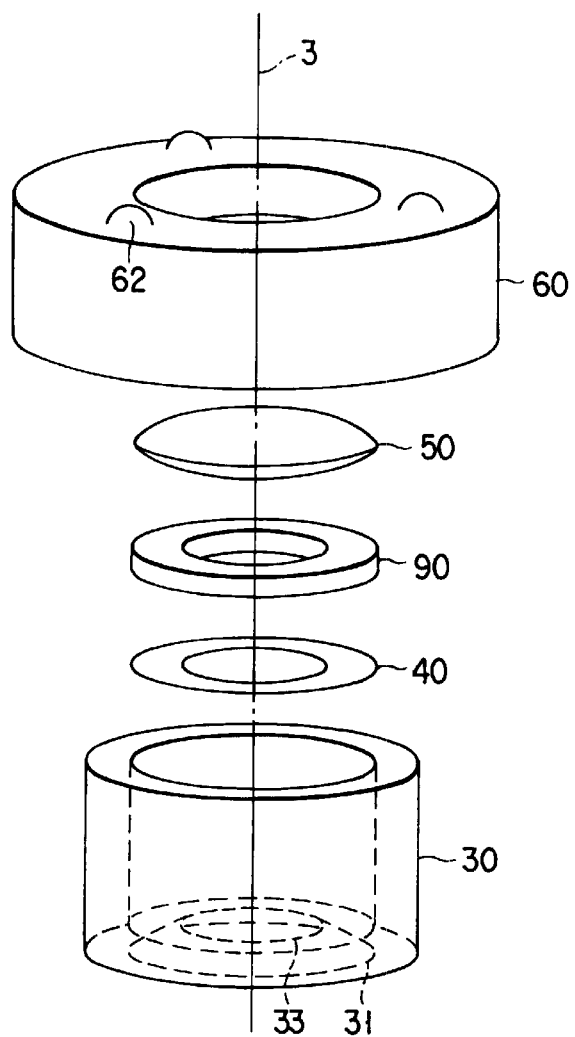
FIG. 11B is an exploded view of a second modification of the first to eighth embodiments of the invention.
Figure 11C:
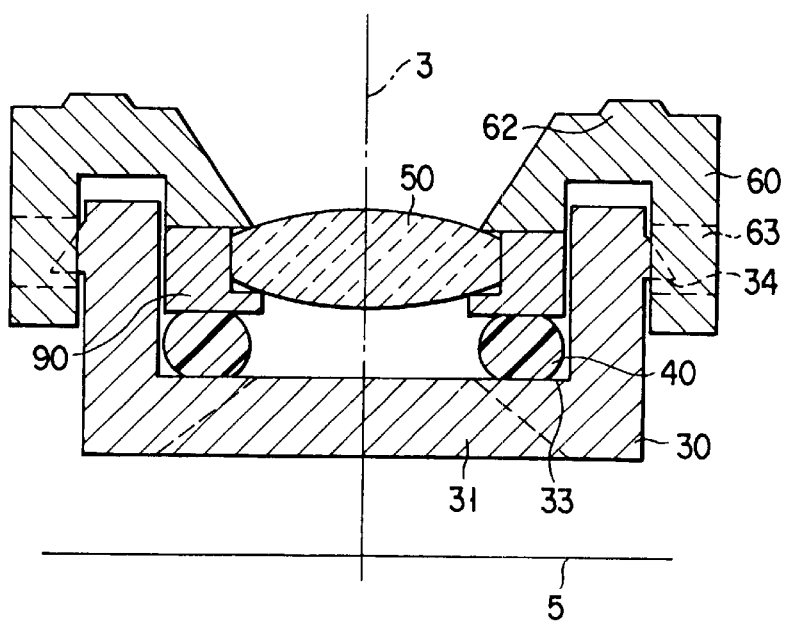
FIG. 11C is a sectional view of the optical lens unit shown in FIG. 11B.

The embodiment of the present invention can be applied to optical lens units that comprise an optical lens having no collar. FIG. 11B is an exploded view depicting such an optical lens unit, or a modification of the first to seventh embodiments. FIG. 11C is a sectional view of the optical lens unit shown in FIG. 11B. As shown in FIGS. 11B and 11C, an optical lens 50 is held between a lens fastener 60 and a ring-shaped holder 90. The holder 90 is mounted on a cushion 40, which is placed on the flange 33 of a lens holder 30.

As may be understood from the modifications illustrated in FIGS. 11A and 11C, the embodiment of the present invention is advantageous if applied to an optical lens unit that has a relatively small number of lenses and to an optical lens unit that has a lens without a collar.

In the sixth and seventh embodiments, projections of the type described in conjunction with the fifth embodiment are provided on the flange 33 of the lens holder 30 and on the optical lens 50. The optical lens 50 is rotated with respect to the flange 33, thereby to adjust the focal point in position. Thus, neither the sixth embodiment nor the seventh embodiment needs to have elastic members. This reduces the number of components. Further, the optical filter 36 provided in the seventh embodiment can be an ordinary square one that is inexpensive.

The optical lens unit according to the eighth embodiment has two optical lenses 50 and 100. The guide 55 is provided for the optical lens 50. The axis of the guide 55 is aligned with the optical axis of the lens unit and combines the lens 50 with the lens 100. The guide 55 therefore easily sets the lenses 50 and 100 in axial alignment. The adoption of acute tip projection can reduce the stress applied between the lenses 50 and 100, because the guide 55 does not directly contact the projections having the inclined surfaces 101-1 to 101-3 of the lens 100. Rather, the projections 57-1 to 57-3 provided on the guide 55 directly contact the inclined surfaces 101-1 to 101-3.

The method of compressing the elastic member is not limited to those employed in the first to fifth embodiments. Although the lens 50 has inclined surfaces 51-t to 51-3 in the sixth embodiment, members each having an inclined surface may be used to move the optical lens 50.

In the fifth to seventh embodiments, the optical lens is moved in its optical axis as it is rotated around the optical axis, while keeping two inclined surfaces in contact. Nonetheless, one of the two inclined surfaces may be replaced by projections as in the eighth embodiment. In this case, too, the same advantages can be attained. In the eighth embodiment, the projections 35-1 to 35-4 and the projections 56-1 to 56-3 may be formed in conformity with the inclined surfaces provided on the collars of the optical lenses 50 and 100.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical lens unit comprising:

an optical lens for focusing a light beam;

a hollow cylindrical lens holder having, on an inner circumferential surface, a support section located on one side of the optical lens and supporting a circumferential part thereof;

an elastic member interposed between the support section and the optical lens;

a lens fastener movable along an optical axis of the optical lens, clamping the optical lens jointly with the lens holder, contacting, at one end, the other side of the optical lens, and pushing the circumferential part thereof, thereby to deform the elastic member to adjust the position of a focal point of the optical lens; and wherein the elastic member comprises a black light-absorbing body that has a refractive index similar to that of the optical lens, contacts the optical lens, is supported by the support section and absorbs stray light incident to a part of the optical lens.

2. The optical lens unit according to claim 1, wherein the lens holder has a first screw made in the inner circumferential surface that contacts the lens fastener, the lens fastener has a second screw that meshes with the first screw, and the lens fastener moves along the optical axis when rotated around the optical axis, to control a pressure applied to the optical lens.

3. The optical lens unit according to claim 1, further comprising a lens cover abutting, at one surface, on the other end of the lens fastener, and covering the other end thereof, for pushing the lens fastener to move the same along the optical axis, thereby to control a pressure applied to the optical lens.

4. The optical lens unit according to claim 3, further comprising a focal point adjusting slide plate provided on the other surface of the lens cover and having an inclined surface contacting the inclined other surface of the lens cover, for applying a pressure to the lens fastener via the lens cover, when moved parallel to the lens cover, thereby to push the lens fastener to move the same along the optical axis and to control a pressure applied to the optical lens, the inclined surface of said focal point adjusting slide plate and the other inclined surface of the lens cover being inclined at the same angle to a plane vertical to the optical axis.

5. The optical lens unit according to claim 1, wherein the lens holder has first projections provided on one open end near the light source and arranged in a circle, and the lens fastener has second projections provided on a part facing the one open end of the lens holder and arranged in a circle, the first projections and/or said second projections have tops inclined and extending in a circle, and when the lens fastener is rotated with the first and second projections in mutual contact, the lens fastener is moved in the optical axis within the lens holder, thereby to control the pressure applied on the optical lens.

6. The optical lens unit according to claim 1, wherein the elastic member is made mainly of a material selected from the group consisting of rubber and resin.

7. An optical lens unit comprising:

an optical lens for focusing a light beam;

a hollow cylindrical lens holder having, on an inner circumferential surface, a support section located on one side of the optical lens and supporting a circumferential part thereof;

an elastic member interposed between the support section and the optical lens;

a lens fastener movable along an optical axis of the optical lens, clamping the optical lens jointly with the lens holder, contacting, at one end, the other side of the optical lens, and pushing the circumferential part thereof, thereby to deform the elastic member to adjust the position of a focal point of the optical lens; and wherein the elastic member comprises leaf springs, each inclined to that surface of the support section that supports the optical lens.

8. An optical lens unit comprising:

an optical lens for focusing a light beam, said optical lens having first projections provided on a peripheral part and arranged in a circle;

a hollow cylindrical lens holder having a support section supporting the optical lens at one surface thereof and at the peripheral part thereof, said lens holder having second projections on the support section and arranged in a circle, and said first projections and/or said second projections having tops inclined extending in a circle; and a lens fastener movable in the lens holder along an optical axis of the optical lens and coupled to the optical lens, for rotating the optical lens around the optical axis, with the first projections and the second projections set in mutual contact, thereby to adjust the position of a focal point of the optical lens.

9. The optical lens unit according to claim 8, which further comprises an optical filter provided on the optical axis and interposed between the optical lens and the support section of the lens holder, and in which the second projections are located outside a region occupied by the optical filter.

10. The optical lens unit according to claim 9, wherein the optical filter is shaped like a square and the second projections are positioned adjacent to the four corners of the optical filter.

11. An optical lens unit comprising:

a first optical lens having a collar, for focusing a light beam;

a first guide shaped like a ring, provided on one side of the collar of the first optical lens and arranged coaxial with an optical axis of the first optical lens;

a second optical lens having a collar, for focusing a light beam;

a second guide shaped like a ring, provided on one side of the collar of the second optical lens, arranged coaxial with an optical axis of the second optical lens, and has a diameter smaller than that of the first guide; and at least three acute first projections provided on the inner circumferential surface of the first guide and/or the outer circumferential surface of the second guide and contacting both the first guide and the second guide.

12. The optical lens unit according to claim 11, further comprising a ring-shaped light absorber interposed between the first optical lens and the second optical lens, located in the region enclosing the second guide, and contacting the first and/or optical lenses, for absorbing light incident to the first optical lens and/or the second optical lens.

13. The optical lens unit according to claim 11, which further comprises second projections provided on the collar of the first optical lens and contacting the top of the second guide, and in which the second guide has, on the top, inclined surfaces that extend in a circle, the first optical lens is rotated around the optical axis, thereby to adjust the position relative to the position of the second optical lens.

14. The optical lens unit according to claim 11, which further comprises second projections provided on the collar of the second optical lens and contacting the top of the first guide, and in which the first guide has, on the top, inclined surfaces that extend in a circle, the first optical lens is rotated around the optical axis, thereby to adjust the position relative to the position of the second optical lens.

15. The optical lens unit according to claim 7, wherein the lens holder has a first screw made in the inner circumferential surface that contacts the lens fastener, the lens fastener has a second screw that meshes with the first screw, and the lens fastener moves along the optical axis when rotated around the optical axis, to control a pressure applied to the optical lens.

16. The optical lens unit according to claim 7, further comprising a lens cover abutting, at one surface, on the other end of the lens fastener, and covering the other end thereof for pushing the lens fastener to move the same along the optical axis, thereby to control a pressure applied to the optical lens.

17. The optical lens unit according to claim 7, further comprising a focal point adjusting slide plate provided on the other surface of the lens cover and having an inclined surface contacting the inclined other surface of the lens cover, for applying a pressure to the lens fastener via the lens cover, when moved parallel to the lens cover, thereby to push the lens fastener to move the same along the optical axis and to control a pressure applied to the optical lens, the inclined surface of said focal point adjusting slide plate and the other inclined surface of the lens cover being inclined at the same angle to a plane vertical to the optical axis.

18. The optical lens unit according to claim 7, wherein the lens holder has first projections provided on one open end near the light source and arranged in a circle, and the lens fastener has second projections provided on a part facing the one open end of the lens holder and arranged in a circle, the first projections and/or said second projections have tops inclined and extending in the circle, and when the lens fastener is rotated with the first and second projections in mutual contact, the lens fastener is moved in the optical axis within the lens holder, thereby to control the pressure applied on the optical lens.

* * * * *